US008223756B2

(12) United States Patent
Ito et al.

(10) Patent No.: US 8,223,756 B2
(45) Date of Patent: Jul. 17, 2012

(54) NETWORK DEVICE AND COMPUTER PRODUCT

(75) Inventors: Yuji Ito, Fukuoka (JP); Masaya Oda, Fukuoka (JP); Shinichi Kuranari, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1331 days.

(21) Appl. No.: 11/829,163

(22) Filed: Jul. 27, 2007

(65) Prior Publication Data
US 2008/0031233 A1 Feb. 7, 2008

(30) Foreign Application Priority Data

Aug. 4, 2006 (JP) ................................ 2006-213900

(51) Int. Cl.
H03H 15/00 (2006.01)
G06F 15/16 (2006.01)
(52) U.S. Cl. ........ 370/355; 370/389; 370/254; 370/382; 370/392; 370/400; 340/508
(58) Field of Classification Search .................. 370/351, 370/389, 395.52, 382, 230.1, 331, 392; 340/508; 348/441; 463/1; 345/157
See application file for complete search history.

(56) References Cited

U.S. PATENT DOCUMENTS

| | | | | |
|---|---|---|---|---|
| 6,124,790 A | * | 9/2000 | Golov et al. | 340/508 |
| 6,341,130 B1 | * | 1/2002 | Lakshman et al. | 370/389 |
| 6,788,690 B2 | * | 9/2004 | Harri | 370/395.52 |
| 7,215,637 B1 | * | 5/2007 | Ferguson et al. | 370/230.1 |
| 7,409,707 B2 | | 8/2008 | Swander et al. | |
| 7,554,949 B2 | * | 6/2009 | Chen | 370/331 |
| 7,577,148 B2 | * | 8/2009 | Lor et al. | 370/392 |
| 7,916,726 B2 | * | 3/2011 | Rasanen | 370/392 |
| 7,940,694 B2 | * | 5/2011 | Pusateri | 370/254 |
| 2005/0190292 A1 | * | 9/2005 | Yu et al. | 348/441 |
| 2005/0276262 A1 | * | 12/2005 | Schuba et al. | 370/389 |
| 2007/0081529 A1 | * | 4/2007 | Sugiyama et al. | 370/382 |

FOREIGN PATENT DOCUMENTS

| | | | |
|---|---|---|---|
| EP | 1403763 A2 | * | 3/2004 |
| JP | 03166812 A | * | 7/1991 |
| JP | 8-335949 | | 12/1996 |
| JP | H08-335949 | * | 12/1996 |
| JP | 9-270813 | | 10/1997 |
| JP | 2001-249866 | * | 9/2001 |
| JP | 2003-244247 | | 8/2003 |
| JP | 2004-364305 | * | 12/2004 |
| JP | 2005-130489 | | 5/2005 |
| JP | 2006-025203 | * | 1/2006 |
| JP | 2006-25203 | | 1/2006 |
| JP | 2006-148532 | | 6/2006 |

OTHER PUBLICATIONS

Notice of Rejection dated Jan. 25, 2011, from the corresponding Japanese Application.

* cited by examiner

*Primary Examiner* — Ricky Ngo
*Assistant Examiner* — Parth Patel
(74) *Attorney, Agent, or Firm* — Katten Muchin Rosenman LLP

(57) ABSTRACT

A filter-information transmitting/receiving unit transmits path information with the filter information when the filter information is set by a filter setting unit, and receives the path information when the filter information is set in other network device. A filter-combining determining unit determines whether redundant filter information with the other network device is to be combined or deleted, based on the filter information and the path information. A filter control unit issues a filter-setting request or a filter release request based on a result of determination by the filter-combining determining unit.

8 Claims, 17 Drawing Sheets

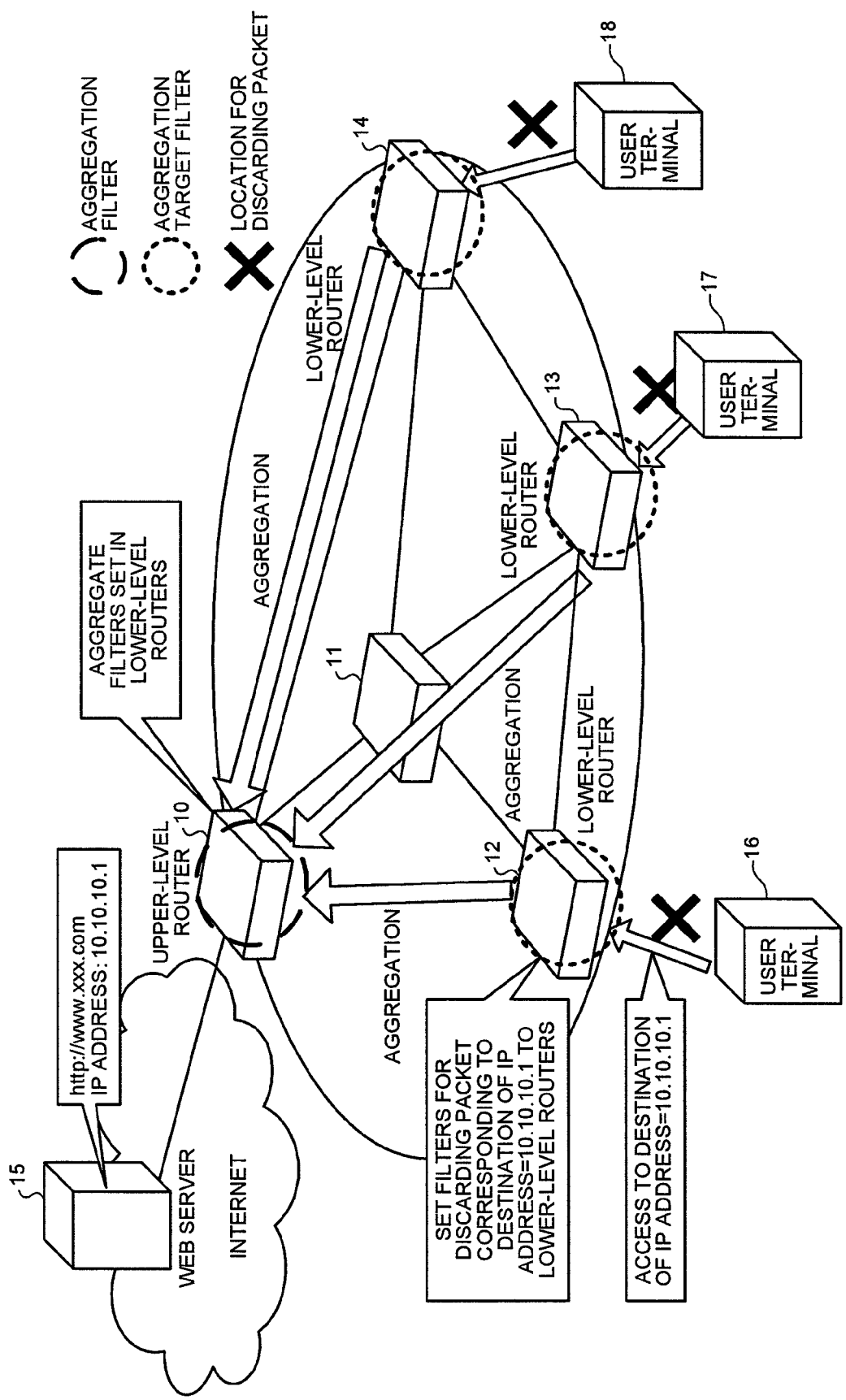

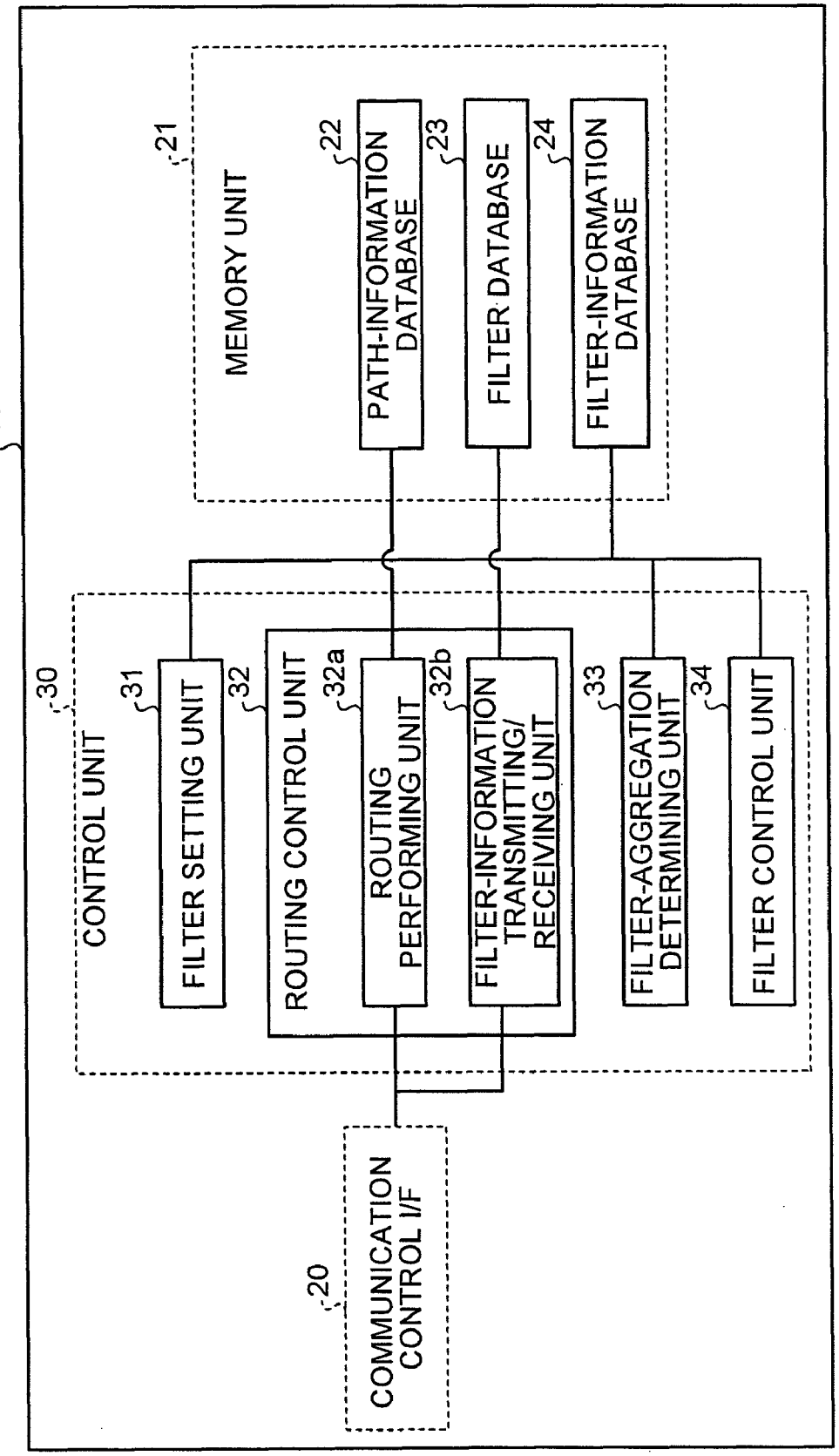

FIG.3

| ROUTER ID | NUMBER OF REGISTRABLE FILTERS | NUMBER OF SET FILTERS | FILTER TYPE | FILTER SETTING VALUE |
|---|---|---|---|---|
| C | 2000 | 1800 | | |
| | | | IP DA | 10.10.10.1 |
| | | | IP DA | 20.20.20.1 |
| D | 1000 | 100 | | |
| | | | IP DA | 10.10.10.1 |
| | | | IP DA | 20.10.1.1 |
| | | | IP DA | 20.20.20.20 |

FIG.4

| FILTER TYPE | FILTER SETTING VALUE | HARDWARE-SETTING FLAG | UPPER-LEVEL ROUTER | LOWER-LEVEL ROUTER |
|---|---|---|---|---|
| IP DA | 10.10.10.1 | YES | NO | NO |
| IP DA | 10.10.10.5 | YES | NO | NO |

FIG.5

| FILTER TYPE | FILTER SETTING VALUE | HARDWARE-SETTING FLAG | UPPER-LEVEL ROUTER | LOWER-LEVEL ROUTER |
|---|---|---|---|---|
| IP DA | 10.10.10.1 | YES | NO | NO |
| IP DA | 10.10.10.5 | YES | NO | NO |

FIG.6

| FILTER TYPE | FILTER SETTING VALUE | HARDWARE-SETTING FLAG | UPPER-LEVEL ROUTER | LOWER-LEVEL ROUTER |
|---|---|---|---|---|
| IP DA | 10.10.10.1 | YES | NO | C, D, E |

FIG.7

| FILTER TYPE | FILTER SETTING VALUE | HARDWARE-SETTING FLAG | UPPER-LEVEL ROUTER | LOWER-LEVEL ROUTER |
|---|---|---|---|---|
| IP DA | 10.10.10.5 | YES | NO | C, D |

FIG.8

| FILTER TYPE | FILTER SETTING VALUE | HARDWARE-SETTING FLAG | UPPER-LEVEL ROUTER | LOWER-LEVEL ROUTER |
|---|---|---|---|---|
| IP DA | 10.10.10.1 | NO | A | NO |
| IP DA | 10.10.10.5 | NO | B | NO |

FIG.9

| FILTER TYPE | FILTER SETTING VALUE | HARDWARE-SETTING FLAG | UPPER-LEVEL ROUTER | LOWER-LEVEL ROUTER |
|---|---|---|---|---|
| IP DA | 10.10.10.1 | YES | NO | C, D, E |
| IP SA | 5.5.5.1 | YES | NO | NO |
| IP DA | 30.1.1.1 | NO | NO | NO |

FIG.10

| OPERATION TYPE | REGISTRATION |
|---|---|
| ROUTER ID | ROUTER E |
| FILTER TYPE | IP DA |
| FILTER SETTING VALUE | 10.10.10.1 |
| NUMBER OF REGISTRABLE FILTERS | 2000 |
| NUMBER OF SET FILTERS | 1800 |

FIG.17

| ROUTER ID | NUMBER OF REGISTRABLE FILTERS | NUMBER OF SET FILTERS | FILTER TYPE | FILTER SETTING VALUE | HIT RATIO [NUMBER OF HITS/h] |
|---|---|---|---|---|---|
| C | 2000 | 1800 | | | |
| | | | IP DA | 10.10.10.1 | 5 |
| | | | IP DA | 20.20.20.1 | 10 |
| D | 1000 | 100 | | | |
| | | | IP DA | 10.10.10.1 | 0 |
| | | | IP DA | 20.10.1.1 | 0 |
| | | | IP DA | 20.20.20.20 | 10 |

FIG.22

| ROUTER | NUMBER OF REGISTRABLE FILTERS | NUMBER OF REGISTERED FILTERS |
|---|---|---|
| A | 100 | 90 |
| B | 100 | 40 |
| C | 100 | 60 |
| D | 100 | 80 |
| E | 100 | 80 |

FIG.23

| FILTER TYPE | FILTER SETTING VALUE | HARDWARE-SETTING FLAG | UPPER-LEVEL ROUTER | LOWER-LEVEL ROUTER |
|---|---|---|---|---|
| IP DA | 10.10.10.1 | YES | NO | C, D, E |

FIG.24

| FILTER TYPE | FILTER SETTING VALUE | HARDWARE-SETTING FLAG | UPPER-LEVEL ROUTER | LOWER-LEVEL ROUTER |
|---|---|---|---|---|
| IP DA | 10.10.10.1 | NO | A | NO |

FIG.25

| FILTER TYPE | FILTER SETTING VALUE | HARDWARE-SETTING FLAG | UPPER-LEVEL ROUTER | LOWER-LEVEL ROUTER |
|---|---|---|---|---|
| IP DA | 10.10.10.1 | YES | NO | NO |

NETWORK DEVICE AND COMPUTER PRODUCT

BACKGROUND OF THE INVENTION

1. Field of the Invention

The present invention relates to a technology for performing a packet filtering and transmission/reception of path information between network devices.

2. Description of the Related Art

Conventionally, a packet filtering with an access control list, a packet filtering function, and the like is generally realized by hardware in a network device such as a router and a switching hub. With the packet filtering realized by the hardware, it is possible to improve a processing speed. However, when the number of filters to be set is increased, hardware resources may be depleted because of a hardware resource limitation.

On the other hand, the packet filtering is realized by software in some cases. If the packet filtering is realized by the software, it is possible to prevent a hardware resource depletion. However, when the number of filters to be set is increased, the processing load of the software is increased, resulting in degrading a processing performance of the network device.

A technology for assuring the hardware resource of the network device has been developed for realizing the packet filtering with the access control list and the packet filtering function by the hardware.

For example, a technology for assuring the hardware resource in a router is disclosed in Japanese Patent Application Laid-Open No. 2005-130489. In the above technology, a shared access control list is created for the resources on a same line card in the router, so that the shared access control list is used by a plurality of the interfaces in the router, thus enabling to delete copies of the access control lists redundantly set in the same router.

However, with the technology described above, the shared access control list is generated and the redundantly set access control lists are deleted exclusively in the same router. Accordingly, if the access control lists are redundantly set in a plurality of the routers in the same network, copies of the access control lists can hardly be deleted (or combined), which results in failing to effectively assure the hardware resources of the network devices in the same network.

SUMMARY OF THE INVENTION

It is an object of the present invention to at least partially solve the problems in the conventional technology.

A network device according to one aspect of the present invention performs a packet filtering based on set filter information and performs a transmission and a reception of path information with other network device that is connected to the network device via a network. The network device includes a filter setting unit that sets the filter information based on a predetermined request received from either one of the network device and the other network device; a filter-information transmitting/receiving unit that transmits the path information with the filter information added when the filter information is set by the filter setting unit, and receives the path information with the filter information added when the filter information is set in the other network device; a filter-combining determining unit that determines whether redundant filter information that is redundantly set between the network device and the other network device is to be combined or deleted, based on the filter information and the path information received by the filter-information transmitting/receiving unit; and a filter control unit that issues a filter-setting request for combining the redundant filter information to the filter setting unit when it is determined that the redundant filter information is to be combined, and issues a filter release request for deleting the redundant filter information to the filter setting unit when it is determined that the redundant filter information is to be deleted.

A computer-readable recording medium according to still another aspect of the present invention stores therein a computer program for performing a packet filtering based on set filter information and performing a transmission and a reception of path information between a network device and other network device that is connected to the network device via a network. The computer program causes a computer to execute setting the filter information based on a predetermined request received from either one of the network device and the other network device; filter-information transmitting/receiving including transmitting the path information with the filter information added when the filter information is set at the setting, and receiving the path information with the filter information added when the filter information is set in the other network device; determining whether redundant filter information that is redundantly set between the network device and the other network device is to be combined or deleted, based on the filter information and the path information received at the filter-information transmitting/receiving; and filter controlling including issuing a filter-setting request for combining the redundant filter information to the setting when it is determined that the redundant filter information is to be combined, and issuing a filter release request for deleting the redundant filter information to the setting when it is determined that the redundant filter information is to be deleted.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic diagram of an entire configuration of a system including a network device according to a first embodiment of the present invention;

FIG. 2 is a block diagram of the network device shown in FIG. 1;

FIG. 3 is a table of an example of contents of a filter database shown in FIG. 2;

FIG. 4 is a table of an example of contents of a filter-information database of a router shown in FIG. 1 before performing a filter combining;

FIG. 5 is a table of another example of contents of a filter-information database of the router before performing the filter combining;

FIG. 6 is a table of an example of contents of a filter-information database of the router after performing the filter combining;

FIG. 7 is a table of another example of contents of a filter-information database of the router after performing the filter combining;

FIG. 8 is a table of still another example of contents of a filter-information database of the router after performing the filter combining;

FIG. 9 is a table of an example of contents of a filter-information database shown in FIG. 2;

FIG. 10 is a table of an example of contents of filter information to be transmitted and received by the network device shown in FIG. 2;

FIG. 17 is a table of an example of contents of a filter database shown in FIG. 16;

FIG. 22 is a table of an example of contents of a filter-information database shown in FIG. 21;

FIG. 23 is a table of an example of contents of a filter-information database shown in FIG. 21;

FIG. 24 is a table of an example of contents of a filter-information database stored in a router-C shown in FIG. 20 before performing the filter combining;

FIG. 25 is a table of an example of contents of a filter-information database stored in the router-C shown in FIG. 20 after performing the filter combining;

DETAILED DESCRIPTION OF THE PREFERRED EMBODIMENTS

Figure 11:
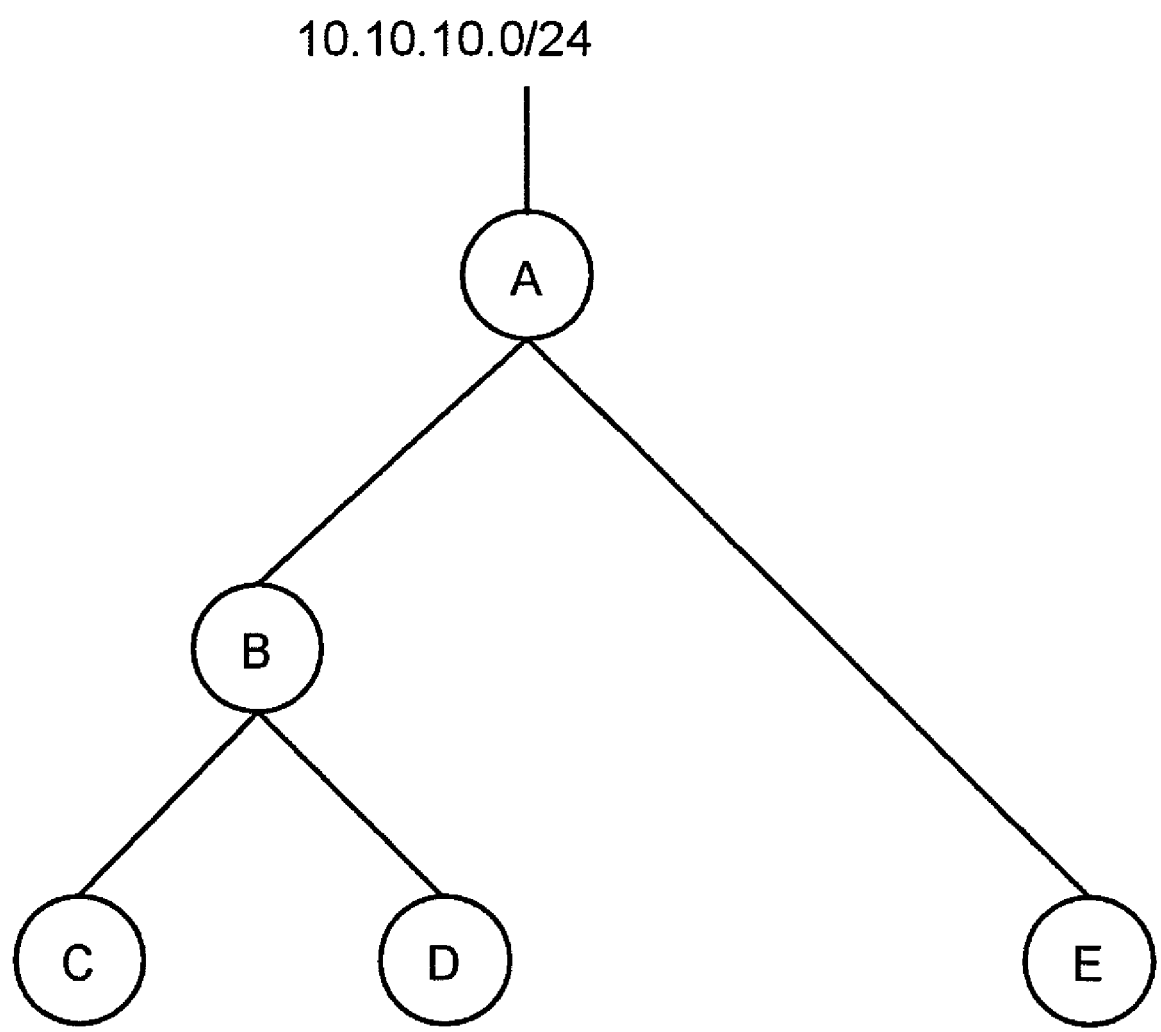
FIG. 11 is a diagram of a topology tree created by the network device shown in FIG. 2.

Exemplary embodiments of the present invention are explained below in detail with reference to the accompanying drawings.

FIG. 1 is a schematic diagram of an entire configuration of a system including a network device (e.g., router) according to a first embodiment of the present invention. As shown in FIG. 1, the system is configured with a router 10 (hereinafter, "network device 10"), a router 11, a router 12, a router 13, and a router 14, each connected to a web server 15 with an IP address 10.10.10.1, via the Internet. In this case, a user terminal 16 is connected to the router 12, a user terminal 17 to the router 13, and a user terminal 18 to the router 14.

A filter setting for a packet filtering is performed in each of the routers 10 to 14. Specifically, an IP address 10.10.10.1 and an IP address 10.10.10.5 are set in the router 12 as shown in FIG. 4, while an IP address 10.10.10.1 and an IP address 10.10.10.5 are similarly set in the router 13 as shown in FIG. 5. On the other hand, a filter is not set in each of the network device 10, the router 11, and the router 14. With the above configuration, accesses from the user terminals 16 and 17 to the web server 15 with the IP address 10.10.10.1 are denied, while an access from the user terminal 18 to the web server 15 is permitted.

Each of the routers 10 to 14 transmits path information stored in the own router to the rest of the routers, so that same information is shared by all the routers. For transmitting the path information, opaque link-state advertisements (LSA) of an open shortest path first (OSPF) as a routing protocol for a layer 3 is used.

With the above configuration, each of the network device 10, the router 11, the router 12, the router 13, and the router 14 performs a packet filtering based on set filter information and transmits/receives the path information to/from each other, so that hardware resources of all the routers in the same network can be effectively assured.

In the example shown in FIG. 1, when the filter information is set in a router, the router adds the filter information to the path information and transmits the path information with the filter information added to the rest of the routers. On the other hand, when the filter information is set in the rest of the routers, the router receives the path information added with the filter information transmitted from the rest of the routers.

For example, when filter information corresponding to the web server 15 with the IP address 10.10.10.1 is set in the router 14 in response to an instruction operation by a user, the router 14 adds the filter information (see FIG. 10, for example, where "router E" is assigned as the router ID for the router 14) to the path information and transmits the path information with the filter information added to the rest of the routers. In this case, the rest of the routers receive the path information with the filter information added from the router 14.

Each of the routers determines in which router pieces of the filter information redundantly set in a plurality of the routers are combined and in which router redundantly set filter information are deleted, based on received filter information and path information.

Specifically, each of the routers determines which router is the closest to the IP address specified as the filtering condition of the filter setting information, i.e., a device for combining the redundant filter information (upper-level router), and determines which router is the farthest from the specified IP address, i.e., a device for deleting the redundant filter information (lower-level router), by generating a topology tree (see FIG. 11, for example, where a topology tree for routers 10, 11, 12, 13 and 14 is generated with corresponding router IDs A, B, C, D and E, respectively) or by using a shortest path search. In this case, if it is assumed that the filter to the web server 15 with the IP address 10.10.10.1 is set in the router 14, it is determined that the network device 10 that is closest to the IP address 10.10.10.1 is to be the upper-level router, and the router 11, the router 12, the router 13, and the router 14 are to be the lower-level routers.

When the router is determined to be the device for combining the redundant filter information, the router issues a filter setting request for combining the redundant filter information to own filter setting function. When the router is determined to be the device for deleting the redundant filter information, the router issues a filter release request for deleting the redundant filter information to the own filter setting function.

Specifically, the network device 10 determined to be the upper-level router in which the redundant filter information is combined issues the filter-setting request for combining the redundant filter information to the filter setting function of the network device 10, while each of the router 11, the router 12, the router 13, the router 14 issues the filter release request for deleting the redundant filter information to each of the filter setting functions.

Each of the routers 10 to 14 sets the filter information based on a predetermined request received from the own router or from the rest of the routers. Specifically, the network device 10 sets the filter corresponding to the IP address 10.10.10.1 (see FIG. 6, for example, where the lower level routers 12, 13 and 14 are identified by router IDs C, D and E, respectively), while each of the router 12, the router 13, and the router 14 releases the filter corresponding to the IP address 10.10.10.1 (see FIGS. 7 and 8). In other words, the filters corresponding to the IP address 10.10.10.1 respectively set in the router 12, the router 13, and the router 14 are combined in the network device 10. In a similar manner to a case in which the filter is set in each of the routers, accesses to the web server 15 with the IP address 10.10.10.1 from the user terminals 16 to 18 are denied.

In each of the router 12 and the router 13, the same filter corresponding to 10.10.10.5 is redundantly set, so that the filter is combined by determining the upper-level router and the lower-level router by using the above method. In this case, it is determined that the router 11 is to be the upper-level router, while the router 12 and the router 13 are to be the lower-level routers (see FIGS. 7 and 8).

As described above, the system including a network device (router) according to the first embodiment is configured to determine a router that is closest to the IP address specified as a filtering condition of the filter-setting information in the network, i.e., the device in which redundant filter information (upper-level router) is combined, and to determine a router that is farthest to the specified IP address, i.e., the device in which pieces of the redundant filter information (lower-level router) are deleted, by using the shortest-path search or the like. Accordingly, it is possible to combine pieces of the filter-setting information, which are redundantly set in the lower-level routers, in the upper-level router, and the redundant filter-setting information can be deleted from the lower-level router, so that it is possible to delete copies of access control lists redundantly set in a plurality of the routers in the network. Therefore, hardware resources of the routers in the same network can be effectively assured.

FIG. 2 is a block diagram of the network device 10. FIG. 3 is a table of an example of contents of a filter database 23 stored in the network device 10. As shown in FIG. 2, the network device 10 includes a communication control I/F 20, a memory unit 21, and a control unit 30. The communication control I/F 20 controls a communication related to various information transmitted/received between the other routers and the users. Specifically, the communication control I/F 20 controls the communication related to the path information and the filter information between the routers, and related to an access from the user terminal.

The memory unit 21 stores therein various information necessary for a routing and a filtering performed by the control unit 30, and includes a path-information database 22, the filter database 23, and a filter-information database 24.

The path-information database 22 contains path information stored in the own network device and the rest of the network devices. Specifically, the path-information database 22 contains information necessary for accurately delivering a packet transmitted from the user terminal or the like to a transmission destination.

The filter database 23 contains filter information received from the rest of the network devices. Specifically, the filter database 23 contains the filter information stored in the rest of the network devices and received by a filter-information transmitting/receiving unit 32b. For example, as shown in FIG. 3, the filter database 23 contains router ID for identifying a location of the network device in the network, number of registrable filters indicating the number of the registrable filters in the network device, number of set filters indicating the number of filters set in the network device, filter type indicating a type of the set filter, and filter setting value indicating the contents of the set filter. Accordingly, the filter database 23 contains such information as "C, 2000, 1800, IP DA, 10.10.10.1", "D, 1000, 100, IP DA, 20.20.20.20", or the like.

The filter-information database 24 contains filter information to be set. Specifically, the filter-information database 24 contains filter information set by a filter setting unit 31. For example, as shown in FIGS. 4 to 9, the filter-information database 24 contains filter type indicating a type of the set filter, filter setting value indicating the contents of the set filter, hardware-setting flag indicating whether the filter is actually set, upper-level router indicating a network device in which the set filters are combined, and lower-level router indicating a network device in which the filter is released once the filter is combined. Accordingly, the filter-information database 24 contains such information as "IP DA, 10.10.10.1, Yes, No, C, D, E" or "IP SA, 5.5.5.1, Yes, No, No". In this case, the hardware-setting flag is information indicating whether the filter is stored as information and the filter is actually set. (As an example, the lower level routers 12, 13 and 14 identified by router IDs C, D and E, respectively.) If the hardware-setting flag is "Yes", the filter is stored as information and the filter is actually set, while if the hardware-setting flag is "No", the filter is stored as information and the filter is not actually set.

The control unit 30 includes an internal memory for storing therein programs, in which a control program and various process procedures are set, and necessary data, and performs various processes using the programs. Specifically, the control unit 30 includes the filter setting unit 31, a routing control unit 32, a filter-combining determining unit 33, and a filter control unit 34. The filter setting unit 31 corresponds to a filter setting unit described in the appended claims, the filter-combining determining unit 33 to a filter-combining determining unit, and the filter control unit 34 to a filter control unit.

The filter setting unit 31 sets filter information based on a predetermined request received from the own network device or the rest of the network devices. Specifically, the network device 10 sets the filter information based on the filter-setting request issued by the filter control unit 34 or received from the rest of the routers.

For example, the filter setting unit 31 receives a filter-setting request (or an instruction) from the filter control unit 34. The filter-setting request is "registration indicating an operation type, filter type indicating a filter type, filter value indicating a filter value, hardware-setting flag indicating whether the filter is actually set, upper-level router indicating a network device in which the set filters are combined, lower-level router indicating a network device in which the filter is released once the filter is combined", i.e., "registration, IP DA, 10.10.10.1, No, No". Subsequently, the filter setting unit 31 stores received filter information in the filter-information database 24 to set the filter.

Similarly, the filter setting unit 31 receives a filter release request (or an instruction) from the filter control unit 34. The filter release request is "deletion, IP DA, 10.10.10.1, No, No", so that the filter setting unit 31 deletes the received filter information from the filter-information database 24 to release the filter.

Furthermore, when the filter setting unit 31 receives a filter combining request (or an instruction) from the filter control unit 34. The filter combining request is "registration, IP DA, 10.10.10.1, No, No", the filter setting unit 31 refers to the filter information received from the filter database 23, so that the filter setting unit 31 stores the filter information in association with the lower device, i.e., "IP DA, 10.10.10.1, NO, C, D, E", in the filter-information database 24, to perform the filter combining (see FIG. 6).

The routing control unit 32 performs a routing based on the path information to be stored, or performs transmission/reception of the filter information to be set. Furthermore, the routing control unit 32 includes a routing performing unit 32*a* and the filter-information transmitting/receiving unit 32*b*. The filter-information transmitting/receiving unit 32*b* corresponds to a filter-information transmitting/receiving unit described in the appended claims.

The routing performing unit 32*a* performs a routing based on the stored path information. Specifically, the routing performing unit 32*a* performs a routing based on the path information stored in the path-information database 22, so that a packet transmitted from the user terminal is accurately delivered to a transmission destination.

The filter-information transmitting/receiving unit 32*b* adds the filter information to the path information and transmits the path information with the filter information added to the rest of the network devices when the filter setting unit 31 sets the filter information. The filter-information transmitting/receiving unit 32*b* receives the path information with the filter information added from the rest of the network devices when the filter information is set in the other network devices. For example, the information to be added as the filter information to the path information when the filter setting unit 31 sets the filter information is "operation type indicating operation contents, router ID for identifying a location of the network device in the network, a filter type indicating a type of the set filter, filter setting value indicating the contents of the set filter, number of registrable filters indicating the number of the registrable filters in the network device, and number of set filters indicating the number of the filters set in the network device".

When the filter information is set in the rest of the routers, the filter-information transmitting/receiving unit 32*b* receives the path information with the filter information added, i.e., "operation type, router ID, filter type, filter setting value, number of registrable filters, and number of set filters" from the rest of the routers, stores the path information in the path-information database 22, and stores the filter information added to the path information in the filter database 23. The filter information to be added is, similarly to a case where the information is transmitted, "operation type, router ID, filter type, filter setting value, number of registrable filters, number of set filters", i.e., "registration, router, IP DA, 10.10.10.1, 2000, 1800".

The filter-combining determining unit 33 determines whether a device is for combining the filter redundantly set in the rest of the network devices or for releasing the redundantly set filters, based on the filter information and the path information received by the filter-information transmitting/receiving unit 32*b*. Specifically, the filter-combining determining unit 33 determines a router closest to the IP address as a filtering condition of the filter-setting information received by the filter-information transmitting/receiving unit 32*b* in the network, i.e., a device for combining the filters (upper-level router), and a router farthest to the IP address, i.e., a device for releasing the filters (lower-level router), by generating a topology tree or by using a shortest path search.

For example, when a filter corresponding to the web server 15 with the IP address 10.10.10.1 is set in the router 14, the rest of the routers generate a topology tree as shown in FIG. 11 to determine whether own router is to be a device for combining the filters or to be a device for releasing the filters. In the example shown in FIG. 11, the topology tree is generated for the network 10.10.10.0/24, so that the network device 10 located at the top of the tree among the routers through which a packet is transmitted to the IP address 10.10.10.1 is determined to be a device for combining the filters, while the router 12, the router 13, and the router 14 located at the lowest in the tree are determined to be the devices for releasing the filters.

When determined to be a device for combining the filter by the filter-combining determining unit 33, the filter control unit 34 issues the filter-setting request for combining the redundant filters to the filter setting unit 31. On the other hand, when determined to be a device for releasing the redundant filters by the filter-combining determining unit 33, the filter control unit 34 issues the filter release request for releasing the redundant filters to the filter setting unit 31.

For example, when the network device 10 performs a determination whether to be a device for combining the filters or to be a device for releasing the redundant filters based on the topology tree shown in FIG. 11. If the network device 10 is determined to be the device for combining the filters, the network device 10 issues the filter-setting request for combining the redundant filters, i.e., "registration, filter type, filter value, hardware-setting flag, upper-level router, lower-level router" or "registration, IP DA, 10.10.10.1, No, No" to the filter setting unit 31. On the other hand, if other routers are determined to be the devices for releasing the redundant filters, the other routers issue the filter release request for releasing the redundant filters, i.e., "registration, filter type, filter value, hardware-setting flag, upper-level router, lower-level router", or "deletion, IP DA, 10.10.10.1, No, No" to the filter setting unit 31.

Figure 12:
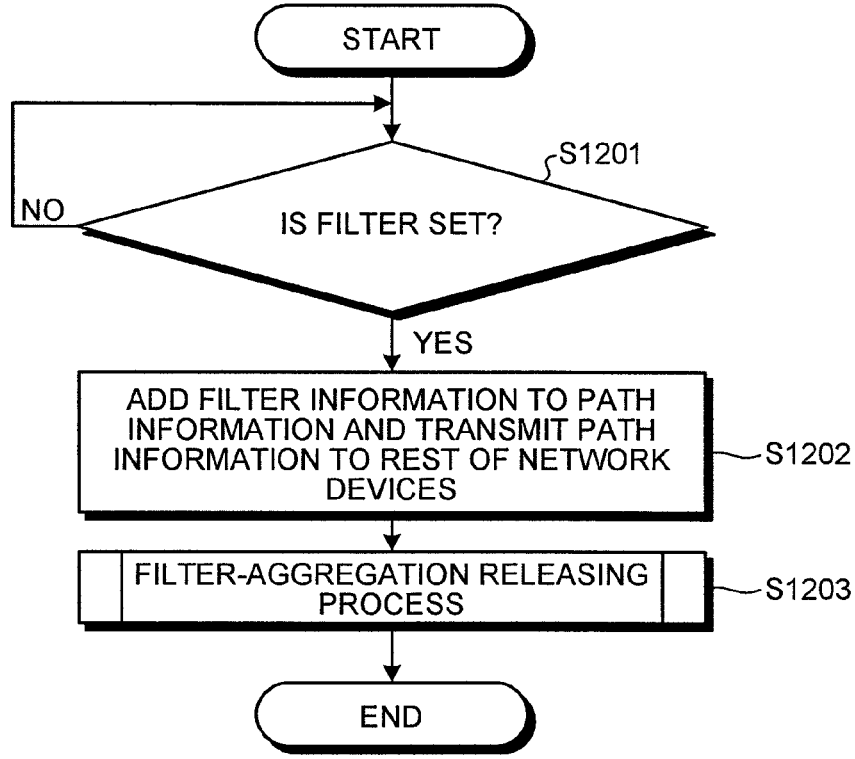
FIG. 12 is a flowchart of a filter setting process performed by the network device shown in FIG. 2.
Figure 13:
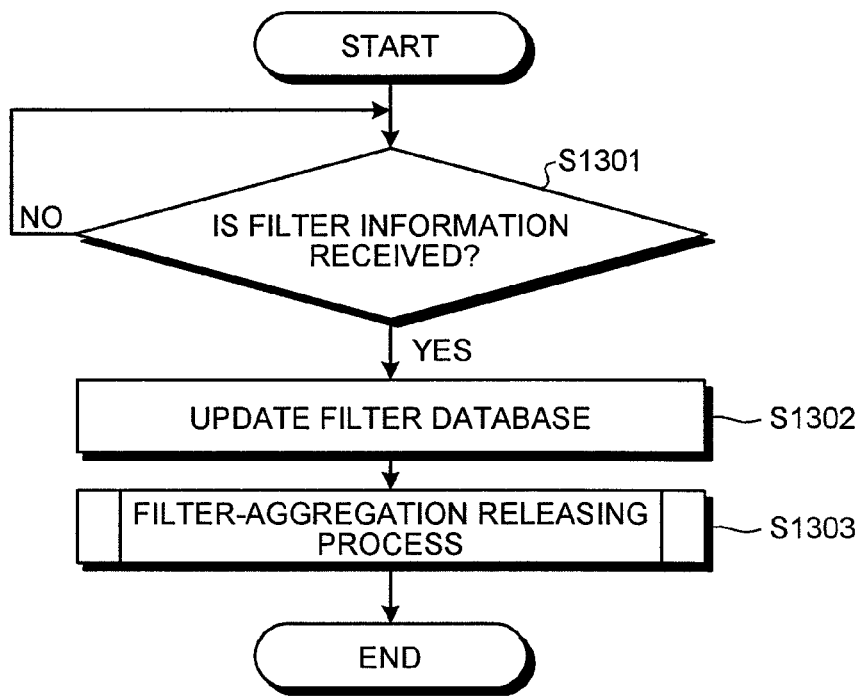
FIG. 13 is a flowchart of a filter-information receiving process performed by the network device shown in FIG. 2.
Figure 14:
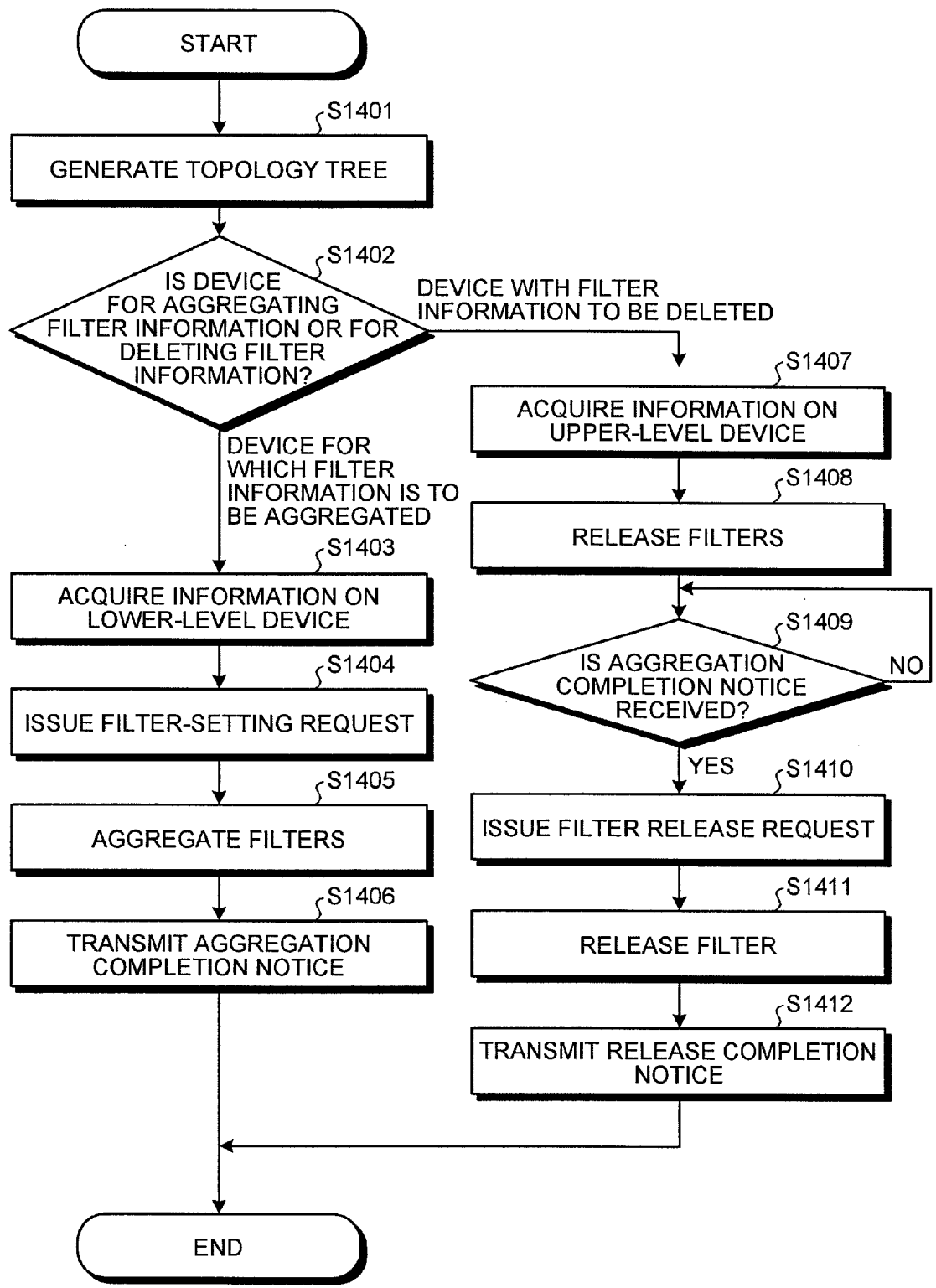
FIG. 14 is a flowchart of a filter-combining releasing process performed by the network device shown in FIG. 2.

A process performed by the network device is explained with reference to FIGS. 12 to 14. FIG. 12 is a flowchart of a filter setting process performed by the network device 10. FIG. 13 is a flowchart of a filter-information receiving process performed by the network device 10. FIG. 14 is a flowchart of a filter-combining releasing process performed by the network device 10.

As shown in FIG. 12, when the filter is set by the filter setting unit 31 of the network device 10 (Yes at step S1201), the filter-information transmitting/receiving unit 32*b* adds the filter information to the path information and transmits the path information to the rest of the network devices (step S1202). Subsequently, the network device 10 performs the filter-combining releasing process described later with reference to FIG. 14 (step S1203).

As shown in FIG. 13, when the filter-information transmitting/receiving unit 32*b* of the network device 10 receives the filter information (Yes at step S1301), the routing control unit 32 updates the filter database 23 using the received filter information (step S1302), and the network device 10 performs the filter-combining releasing process described later with reference to FIG. 14 (step S1303).

As shown in FIG. 14, the network device 10 generates a topology tree based on the received filter information and the path information (step S1401), and determines whether to be a device for combining the filter information redundantly set in the rest of the network devices or to be a device for deleting the redundant filter information, based on the generated topology tree (step S1402).

When determined to be the device for combining the filters, the network device 10 acquires information on the lower-level device from the path-information database 22 and the filter database 23 (step S1403), issues the filter-setting request for combining the redundant filter information to the filter setting unit 31 (step S1404), and sets the filter information, i.e., performs the filter combining (step S1405). When the filter combining is completed, the network device 10 transmits the combining completion notice to the rest of the network devices (step S1406).

On the other hand, when the device is determined to be the device for deleting the redundant filter information at step S1401, the network device 10 acquires information on the upper-level device (a device for combining the filters) from the path-information database 22 and the filter database 23 (step S1407), and disables the filter to be combined, i.e., the filter to be released (step S1408). When receiving the combining completion notice from the device for combining the filters (Yes at step S1409), the network device 10 issues the filter release request for deleting the redundant filter information to the filter setting unit 31 (step S1410), and releases a filter (step S1411). When the filter release is completed, the network device 10 transmits the release completion notice to the rest of the network devices (step S1412). When the device is determined neither to combine the filters nor to release the filters, the above processes are not performed.

A process procedure of the filter-combining-releasing process is explained in detail with reference to FIG. 1, and FIGS. 4 to 8. FIG. 4 is a table of an example of contents of filter-information of the router 12 before performing the filter combining. FIG. 5 is a table of an example of contents of filter-information of the router 13 before performing the filter combining. FIG. 6 is a table of an example of contents of filter-information of the network device 10 after performing the filter combining. FIG. 7 is a table of an example of contents of filter-information of the router 11 after performing the filter combining. (As an example, the routers 12 and 13 identified by router IDs C and D, respectively.) FIG. 8 is a table of an example of contents of filter-information database of the router 12 after performing the filter combining.

For example, the router 12 stores therein the filter information of "filter type, filter value, hardware-setting flag, upper-level router, lower-level router", i.e., "IP DA, 10.10.10.1, Yes, No, No" and "IP DA, 10.10.10.5, Yes, No, No". The router 13 stores therein the same filter information as that of the router 12 as shown in FIG. 5. The network device 10, the router 11, and the router 14 do not store therein the filter information.

With the above configuration, if the filter corresponding to the web server 15 with the IP address 10.10.10.1 is set in the router 14, all the routers transmit/receive the filter information with each other, so that all the routers generate the topology tree shown in FIG. 11 to determine a device for combining the filters and a device for releasing the filters. In other words, in the example shown in FIG. 11, the topology tree is generated for the network 10.10.10.0/24, so that the network device 10 located at the top of the topology tree through which a packet is transmitted to the IP address 10.10.10.1 is determined to be the device for combining the filters, while the router 12, the router 13, and the router 14 located at the lowest in the tree is determined to be the devices for releasing the filters.

The network device 10 for combining the filters acquires information on the lower-level routers (the router 12, the router 13, and the router 14) corresponding to the filter setting value to be combined as the lower device information from the path-information database 22 and the filter database 23.

The filter control unit 34 of the network device 10 issues the filter-setting request indicating a device for combining the redundant filter information to the filter setting unit 31. Subsequently, the filter setting unit 31 of the network device 10 acquires the filter information based on the filter combining request received from the own router 10. In other words, the filter setting unit 31 sets the filter information of "filter type, filter setting value, hardware-setting flag, upper-level router, lower-level router", that is, "IP DA, 10.10.10.1, Yes, No, C, D, E" as shown in FIG. 6. When the filter setting unit 31 of the network device 10 completes the filter combining, the filter-information transmitting/receiving unit 32b transmits the combining completion notice to all the routers.

On the other hand, the router 12, the router 13, and the router 14, of which filters are to be released, acquire information on the upper-level router (the network device 10) corresponding to the filter setting value to be deleted as the information on the upper-level device from the path-information database 22 and the filter database 23. Subsequently, the filter setting unit 31 of each of the router 12, the router 13, and the router 14 disables the filter to be released.

In other words, as shown in FIG. 8, the router 12 performs a filter setting of "filter type, filter setting value, hardware-setting flag, upper-level router, lower-level router", that is, "IP DA, 10.10.10.1, No, A, No" and "IP DA, 10.10.10.5, No, B, No". The same setting is also performed to the router 13. When receiving the combining completion notice from the network device 10, the router 12, the router 13, and the router 14 delete disabled filter information.

In the router 12 and the router 13, the same filter information corresponding to 10.10.10.5 is redundantly set, so that the router 11 is determined to be a device for combining the filters while the router 12 and the router 13 are determined to be devices for releasing the filters, based on the topology tree shown in FIG. 11. The router 11 combines the filters in the same manner described above. In other words, as shown in FIG. 7, the router 11 sets the filter information of "filter type, filter setting value, hardware-setting flag, upper-level router, lower-level router", i.e., "IP DA, 10.10.10.5, Yes, No, C, D".

As described above, according to the first embodiment, the filter information is set based on a predetermined request received from the network device or from the other network devices. When the filter information is set in the network device, the filter information is added to the path information and the path information is transmitted to the other network devices. When the filter information is set in the other network devices, the network device receives the path information with the filter information added from the other network devices. Subsequently, the network device determines whether to be the devices for combining the filter information redundantly set among the network devices or to be the device for deleting the redundant filter information, based on the received filter information and the path information. When determined to be the device for combining the filter information, the network device issues the filter-setting request for combining the redundant filter information to the filter setting unit. On the other hand, when determined to be the device for deleting the redundant filter information, the network device issues the filter release request for deleting the redundant filter information to the filter setting unit. For example, it is possible to determine a router closest to the IP address specified as the filtering condition of the filter setting information in the network, i.e., a device for combining the filter information (router 10), and a router farthest to the IP address, i.e., a device for deleting the filter information (the routers other than the network device 10), by using a shortest path search or the like. In this case, the network device 10 combines the filter setting information redundantly set in the other routers, while the other routers deletes the redundant filter setting information. Accordingly, it is possible to delete copies of the access control list redundantly set in a plurality of the routers in the network. As a result, the hardware resources of all the routers in the same network can be effectively assured.

Furthermore, according to the first embodiment, an example is described in which the device performs a determination whether to be the device for combining the redundant filter information or to be the device for deleting the redundant filter information, based on the received filter information and the path information. However, the present invention is not thus limited and it is possible to perform the above determination based on a filter validity.

A case in which a network device performs a determination whether to be a device for combining the redundant filter information or to be a device for deleting the redundant filter information, by calculating the filter validity and based on calculated filter validity is explained below in a second embodiment of the present invention with reference to FIGS. 15 to 17.

Figure 15:
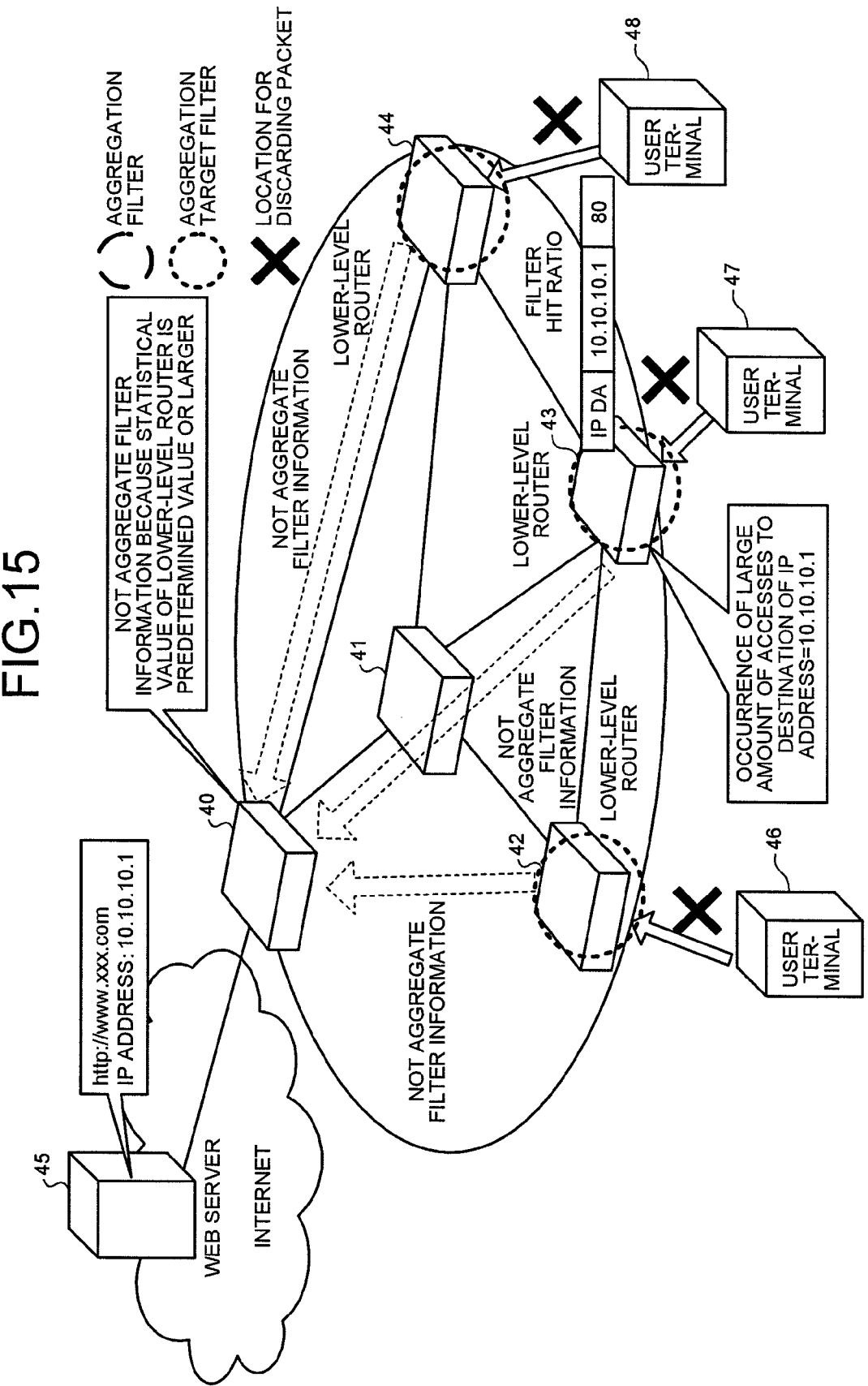
FIG. 15 is a schematic diagram of an entire configuration of a system including a network device according to a second embodiment of the present invention.

FIG. 15 is a schematic diagram of an entire configuration of a system including a network device according to the second embodiment. FIG. 16 is a block diagram of the network device shown in FIG. 15. FIG. 17 is a table of an example of contents of a filter database 53.

As shown in FIG. 15, the system according to the second embodiment is constituted of a router 40 (hereinafter, "network device 40"), a router 41, a router 42, a router 43, and a router 44, each connected to a web server 45 with an IP address 10.10.10.1 via the Internet. In this case, a user terminal 46 is connected to the router 42, a user terminal 47 to the router 43, and a user terminal 48 to the router 44.

A filter is set in each of the above routers for performing the packet filtering. Specifically, the IP address 10.10.10.1 and the IP address 10.10.10.5 are set in the router 42, and the IP address 10.10.10.1 and the IP address 10.10.10.5 are similarly set in the router 43. The filter is not set in the network device 40, the router 41, and the router 44.

On the other hand, each of the above routers refers to the set filter information at a regular time interval, calculates an access hit ratio to the filter (validity), and stores the validity in a filter-information database 54. Each of the above routers adds stored validity as the filter information to the path information and transmits the path information to the rest of the routers. The rest of the routers receive the path information and store the filter information indicating the validity in the filter-information database 54. Each of the routers examines calculated and stored validity to determine whether to be the router for combining the filter information redundantly set in the rest of the routers or to be the router for deleting the redundant filter information.

For example, with the above configuration, the web server 45 with the IP address 10.10.10.1 is set in the router 44, and the path information with the filter information added is transmitted and received between all the routers. In this case, pieces of the filter information corresponding to the IP address 10.10.10.1 set in each of the router 42, the router 43, and the router 44 are redundant.

In a normal case, each of the routers determines that the network device 40 is to be the device for combining the filter information and the router 42, the router 43, and the router 44 are to be the devices for deleting the redundant filter information, by using the topology tree or the shortest-path search. However, when the access hit ratio (validity) of the filter, which corresponds to 10.10.10.1 and is to be released, becomes equal to or larger than a predetermined value in the router 43 due to an occurrence of the large access hit ratio, each of the routers exceptionally determines not to perform the filter combining (i.e., not to perform the filter release).

In this manner, it is possible to prevent a large amount of packets from flowing into the network, which is caused by combining the filter with high validity (high access hit ratio). As a result, an increase of a network load can be prevented.

Figure 16:
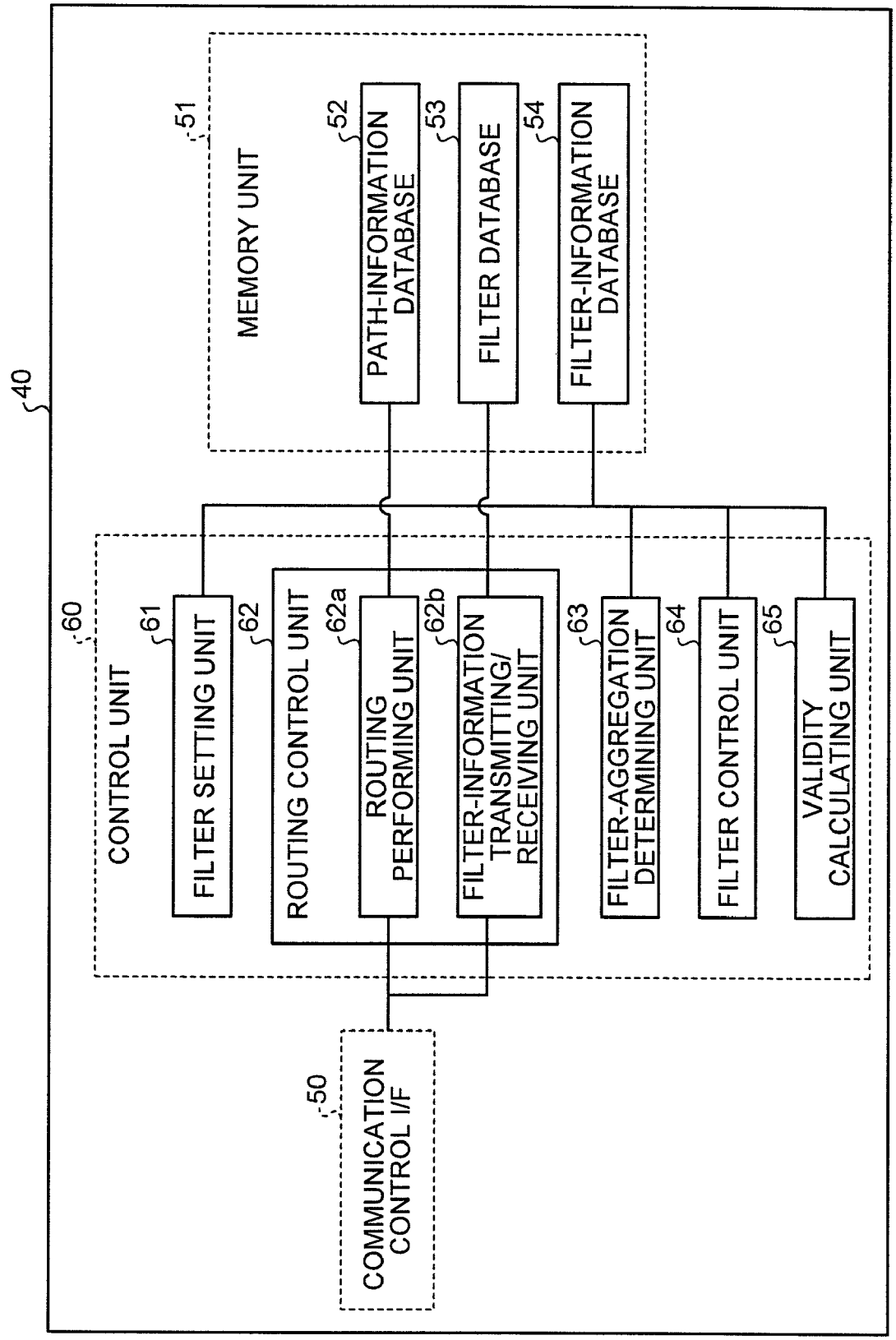
FIG. 16 is a block diagram of the network device shown in FIG. 15.

As shown in FIG. 16, the network device 40 includes a communication control I/F 50, a memory unit 51, and a control unit 60. The memory unit 51 includes a path-information database 52 and the filter-information database 54. The control unit 60 includes a filter setting unit 61, a routing control unit 62 including a routing-performing unit 62a and a filter-information transmitting/receiving unit 62b, and a filter control unit 64. Each of the communication control I/F 50, the path-information database 52, the filter-information database 54, the filter setting unit 61, the routing control unit 62, and the filter control unit 64 has the same function as the function of the communication control I/F 20, the path-information database 22, the filter-information database 24, the filter setting unit 31, the routing control unit 32, and the filter control unit 34, so that explanations thereof are omitted. The filter database 53, a filter-combining determining unit 63, and a validity calculating unit 65 each having a different function as that described in the first embodiment are explained below.

The filter database 53 contains filter information received from the rest of the network devices. Specifically, the filter database 53 contains the filter information stored in the rest of the network devices and received by the filter-information transmitting/receiving unit 62b. For example, the filter database 53 contains hit ratio (the number of hits per hour) indicating the number of accesses per hour, in addition to the information described in the first embodiment, i.e., "router ID, number of registrable filters, number of set filters, filter type, filter setting value". Specifically, as shown in FIG. 17, the filter database 53 contains information of "C, 2000, 1800, IP DA, 10.10.10.1, 5" or "D, 1000, 100, IP DA, 20.20.20.20, 10".

The filter-combining determining unit 63 examines the validity calculated by the validity calculating unit 65, and determines a device for combining the filter information redundantly set in the rest of the network devices and a device for deleting the redundant filter information. Specifically, when the access hit ratio (validity) of the filter to be combined exceeds a predetermined threshold, the filter combining (or filter release) is not performed. For example, assuming that the threshold of the access hit ratio is previously set and when the access hit ratio of the filter exceeds the threshold in any one of the routers storing therein the filter to be combined, it is determined not to perform the filter combining (or filter release). When the access hit ratio (validity) of the filter to be combined does not exceed the predetermined threshold, it is determined to perform the filter combining (or filter release). The process of examining the validity and determining a device for combining the filter information redundantly set in the rest of the routers and a device for deleting the redundant filter information is performed before performing step S1401 (a first step of the filter-combining releasing process).

The validity calculating unit 65 calculates the validity of the filter information. Specifically, the number of the accesses to the filter is counted with respect to each set filter and the validity is calculated by quantifying the number of the accesses per hour. The calculated validity is transmitted by the filter-information transmitting/receiving unit 62b to the rest of the network devices. In the example shown in FIG. 17, it is calculated that the hit ratio (the number of hits per hour) is 5 for the filter corresponding to 10.10.10.1 in the router 42, while it is calculated that the hit ratio (the number of hits per hour) is 10 for the filter corresponding to 20.20.20.20 in the router 43. The validity calculated by the router 42 is transmitted as the filter information to the rest of the network devices (the network device 40, the router 41, the router 42, the router 43, and the router 44) by the filter-information transmitting/receiving unit 62b.

As described above, according to the second embodiment, the validity of the filter information is calculated and a device is determined whether to be a device for combining the filter information redundantly set in the rest of the routers or a device for deleting the redundant filter information, based on the calculated validity. Accordingly, it is possible to prevent a large amount of packets from flowing into the network, caused by combining the filters with high validity (high access hit ratio). As a result, an increase of a network load can be prevented.

According to the first and the second embodiments, it is explained that each of the routers constituting the system includes a function unit (i.e., the filter-combining determining unit) shown in FIGS. 2 and 16. However, the present invention is not thus limited and a router that does not include the function unit shown in FIGS. 2 and 16 (hereinafter, "non-functional router") can be included in the system.

A case in which the non-functional router is included is explained with reference to FIGS. 18 and 19 in a third embodiment of the present invention.

Figure 18:
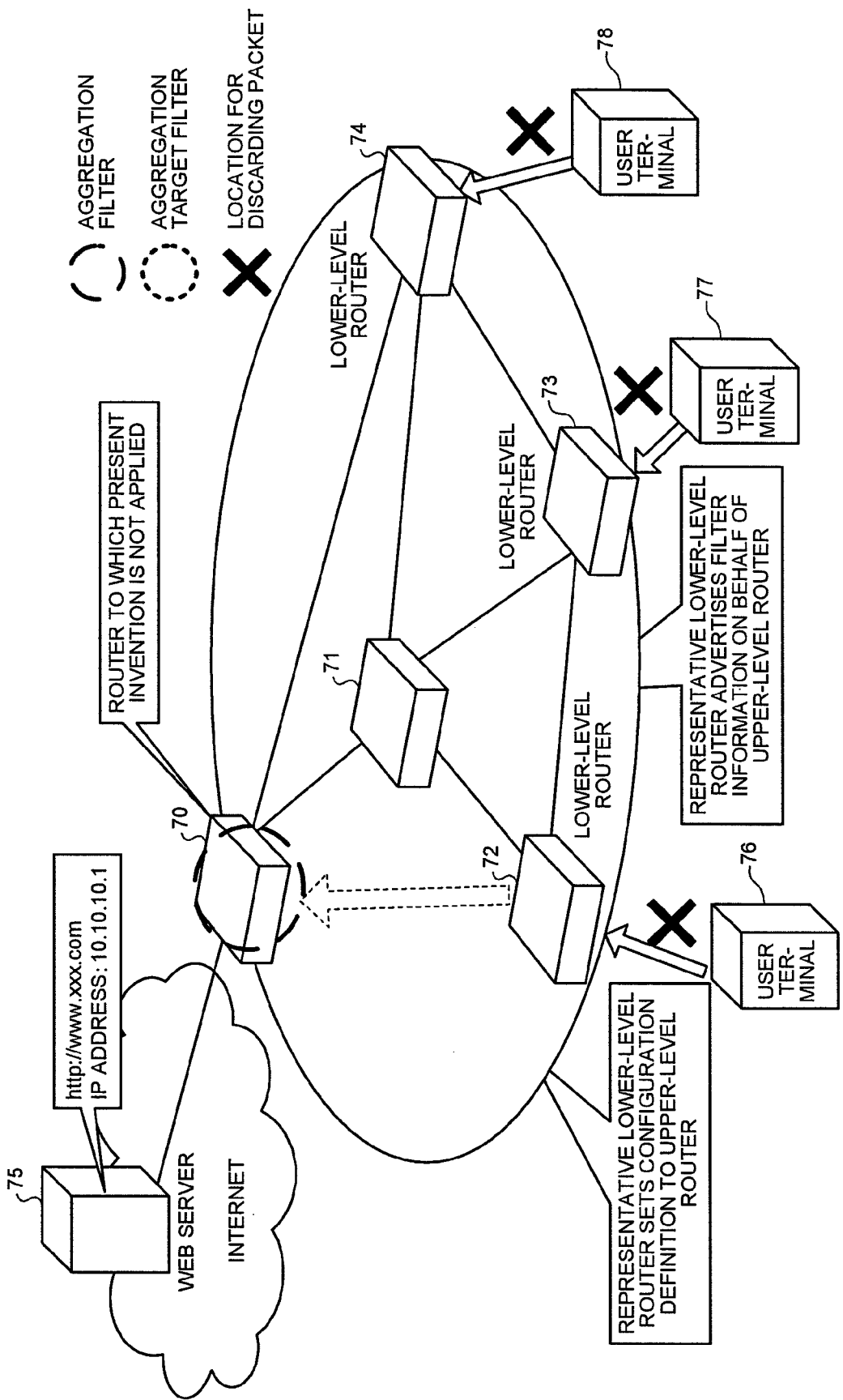
FIG. 18 is a schematic diagram of an entire configuration of a system including a network device according to a third embodiment of the present invention.

FIG. 18 is a schematic diagram of an entire configuration of a system including a network device (e.g., router) according to the third embodiment. As shown in FIG. 18, similarly to the cases described in the first and the second embodiments, the system according to the third embodiment is constituted of a router 70 (hereinafter, "network device 70"), a router 71, a router 72, a router 73, and a router 74, each connected to a web server 75 with an IP address 10.10.10.1. A user terminal 76 is connected to the router 72, a user terminal 77 to the router 73, a user terminal 78 to the router 74. In this case, the network device 70 serves as the non-functional router.

A filter is set for performing the packet filtering in each of the above routers. Specifically, an IP address 10.10.10.1 and an IP address 10.10.10.5 are set in the router 72 and the IP address 10.10.10.1 and the IP address 10.10.10.5 are similarly set in the router 73. A filter is not set in each of the network device 70, the router 71, and the router 74.

With the above configuration, when the filter information is set in the router or in the other routers, each of the routers determines a router for combining the filter information redundantly set in the rest of the routers and a router for deleting the redundant filter information. Each of the routers determined to be the device for deleting the redundant filter information (lower-level router) further determines whether to be a representative lower-level router.

Specifically, when the filter for the web server 75 with the IP address 10.10.10.1 is set in the router 74, the path information with the filter information added is transmitted and received between all the routers. Each of the routers determines that the network device 70 is to be the device for combining the filter information (upper-level router), by using the topology tree or the shortest path search, and determines that the router 72 is to be the representative lower-level router by comparing the priority order previously added to the filter information, by which order each of the routers is determined to be the representative lower-level router from among the devices that delete the redundant filter information (lower-level routers). In this case, the filter information corresponding to the IP address 10.10.10.1 is redundantly set in each of the router 72, the router 73, and the router 74.

The representative lower-level router further determines whether a device for combining the filter information includes the filter-combining determining unit. When it is determined that the device for combining the filter information does not include the filter-combining determining unit, the representative lower-level router transmits the filter combining request for combining the redundant filter information to the device for combining the filter information.

In the example described above, the router 72 determined to be the representative lower-level router previously determines whether the network device 70 for combining the filter information includes the filter-combining determining unit. When determining that the network device 70 does not include the filter-combining determining unit, the router 72 transmits the filter combining request for combining the redundant filter information to the network device 70.

The device for combining the filter information sets (combines) the filter information, based on the received filter combining request. On the other hand, the device for deleting the redundant filter information issues the filter release request for deleting the redundant filter information to the filter setting unit, and deletes the filter information.

In the example described above, the network device 70 sets the filter information based on a received predetermined request (filter combining request). On the other hand, the router 72, the router 73, and the router 74 determined to be the devices that delete the redundant filter information issue the filter release request for deleting the redundant filter information to the filter setting unit, and deletes the filter information.

As described above, it is determined whether the other network devices, which combine the filter information, include the filter-combining determining unit. When it is determined that the device for combining the filter information does not include the filter-combining determining unit, the filter combining request for combining the redundant filter information is transmitted to the device for combining the filter information. For example, even when the device for combining the filter information (the network device 70) does not include the filter combining function, the device for deleting the redundant filter information (the router 72) transmits the filter-setting request to the upper device for setting the filter. As a result, it is possible to easily incorporate the network device 70 to the existing network.

The filter-combining releasing process performed by the network device 70 is described in detail with reference to FIG. 19. FIG. 19 is a flowchart of the filter-combining releasing process performed by the network device 70. The processes performed before the filter-combining releasing process, such as the process performed when setting the filter in advance of the filter-combining releasing process and the process performed when receiving the filter information, are the same as those described in the first embodiment, so that the explanations thereof are omitted.

Figure 19:
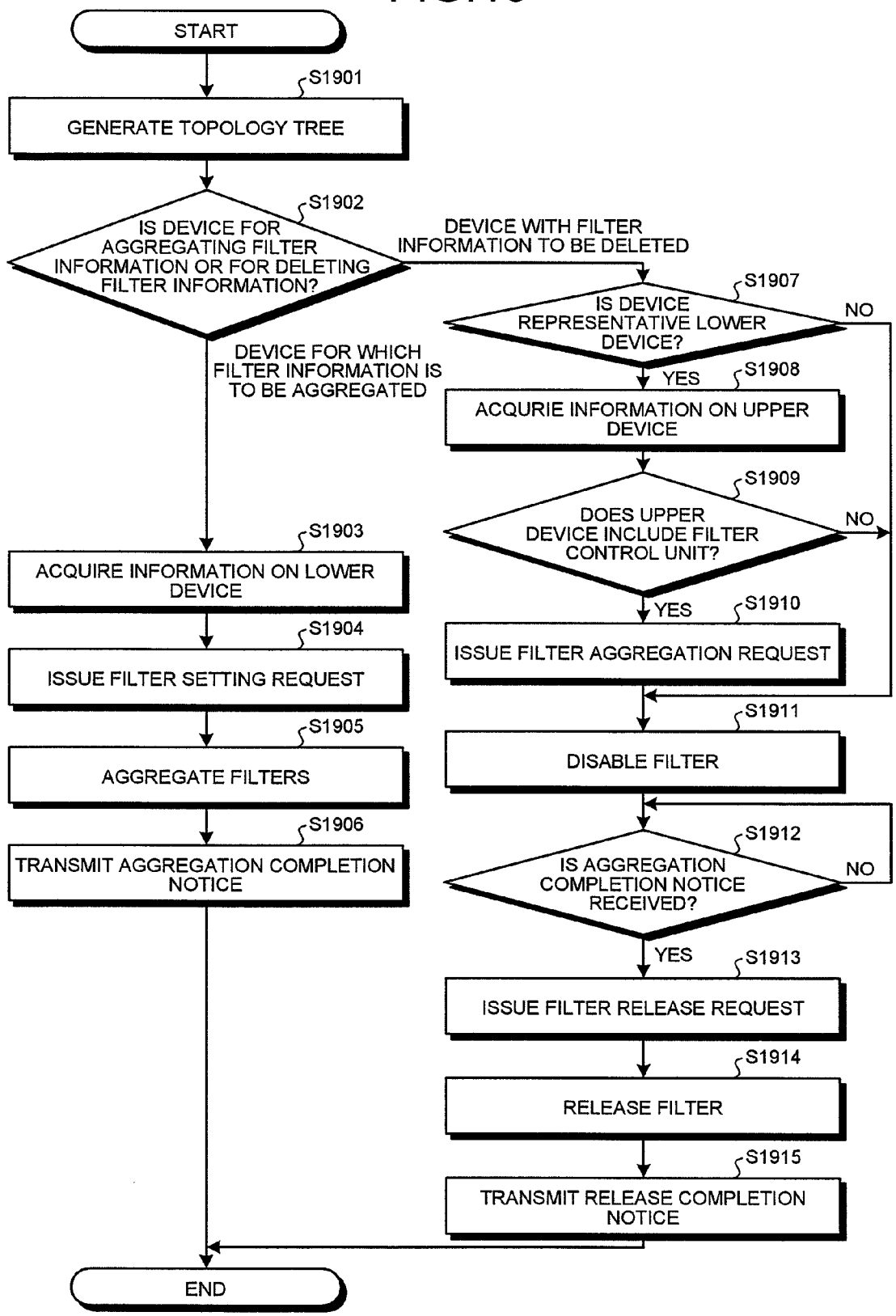
FIG. 19 is a flowchart of a filter-combining releasing process performed by the network device shown in FIG. 18.

As shown in FIG. 19, the network device 70 generates the topology tree based on the received filter information and the path information (step S1901), and determines whether to be the device for combining the filter information redundantly set among the rest of the network devices (upper device), or to be the device for deleting the redundant filter information (lower device) (step S1902). When the network device 70 is determined to be the device for deleting the redundant filter information (lower device), the network device 70 determines whether to be the representative lower device (step S1907).

In the example shown in FIG. 18, the web server 75 with the IP address 10.10.10.1 is set in the router 74, and the path information with the filter information added is transmitted and received between all the routers. Each of the routers determines that the network device 70 is to be the device for combining the filter information (upper-level router), by using the topology tree or the like. Furthermore, each of the routers previously adds the priority by which each of the routers is to be the representative lower-level router from among the devices for releasing the redundant filter (lower-level router) to the filter information. Accordingly, the router 72 determines to be the representative lower-level router, by comparing the priority.

When the network device 70 is determined to be the representative lower device (Yes at step S1907), the network device 70 acquires the upper device information from the path-information database and the filter database (step S1908), and determines whether the other network device that performs the filter combining includes the filter-combining determining unit (step S1909). When the other network device does not include the filter control unit (Yes at step S1909), the network device 70 issues the filter combining request for combining the redundant filter information (step s1910), and performs the filter release process same as that described in the first embodiment (step S1911).

Specifically, the router 72 as the representative lower-level router determines whether the network device 70 for combining the filter information include the filter-combining determining unit. When determining that the network device 70 does not include the filter-combining determining unit, the router 72 transmits the filter combining request for combining the redundant filter information to the network device 70.

On the other hand, if the other network device for combining the filter information includes the filter control unit (No at step S1909), the network device 70 disables the filter to be combined, i.e., the filter to be released (step S1911).

Referring back to step S1907, when the network device 70 is not determined to be the representative lower-level router (No at step S1907), the network device 70 disables the filter to be combined, i.e., the filter to be released (step S1911).

The processes at steps S1911 to S1915 performed after the filter is disabled are the same as those performed at steps S1408 to S1412 described in connection with FIG. 14 according to the first embodiment, so that the explanation thereof is omitted. Furthermore, the processes performed at steps S1902 to S1906 when the network device is determined to be a device for combining the filter information (step S1902) are the same as those performed at steps S1402 to S1406, so that the explanation thereof is omitted.

As described above, it is determined whether the network device for combining the redundant filter information includes the filter-combining determining unit, and when it is determined that the network device does not include the filter-combining determining unit, the filter combining request for combining the redundant filter information is transmitted to the network device for combining the redundant filter information. For example, even when the device for combining the filter information (the network device 70) does not include the filter-combining function, the device of which filter information is to be deleted (the router 72) transmits the filter-setting request to the upper device, so that the filter can be set. Therefore, it is possible to easily incorporate the network device to the existing network.

Although the cases are explained in which the redundant filters are exclusively combined according to the first to the third embodiments, the present invention is not thus limited and it is possible to configure in such a manner that the combined filters are disabled and the setting is performed in the lower device.

A case in which the combined filters are disabled and filter is re-set when the resource of the upper device becomes equal to or larger than a threshold is described in a fourth embodiment of the present invention with reference to FIGS. 20 to 26.

Figure 20:
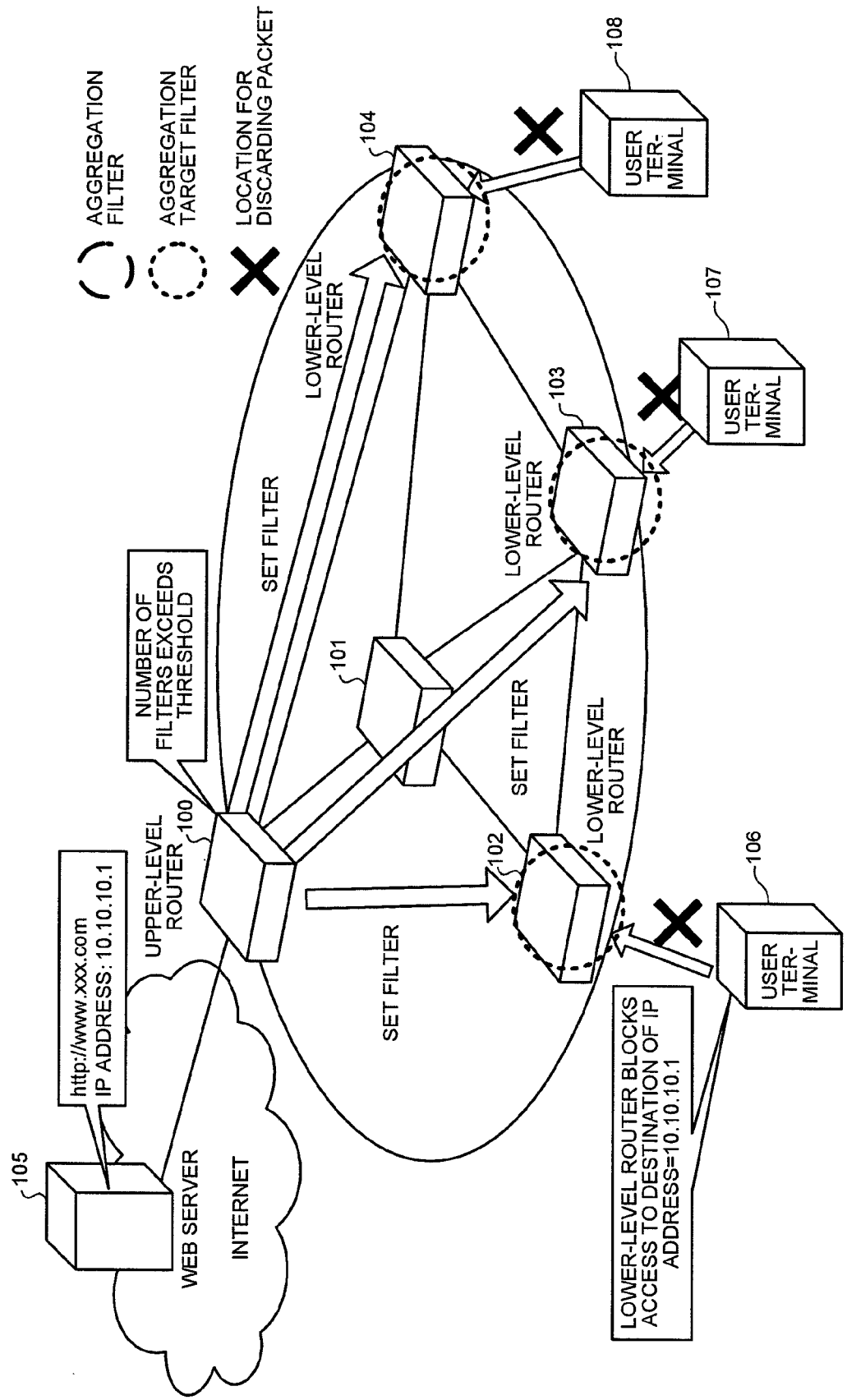
FIG. 20 is a schematic diagram of an entire configuration of a system including a network device according to a fourth embodiment of the present invention.

FIG. 20 is a schematic diagram of an entire configuration of a system including a network device (e.g., router) according to the fourth embodiment. As shown in FIG. 20, similarly to the first to the third embodiments, the system according to the fourth embodiment is constituted of a router 100 (hereinafter, "network device 100"), a router 101, a router 102, a router 103, and a router 104, each connected to an web server 105 with an IP address 10.10.10.1 via the Internet. A user terminal 106 is connected to the router 102, a user terminal 107 to the router 103, and a user terminal 108 to the router 104.

In this case, the filter information corresponding to the IP address 10.10.10.1 is previously set in each of the router 102, the router 103, and the router 104, and combined to the network device 100.

With the above configuration, each of the above routers determines whether a resource state of the filter information is equal to or larger than the threshold. When the resource state is determined to be equal to or larger than the threshold, each of the routers issues the filter release request for deleting combined filter information to the filter setting unit and issues the filter resetting request for resetting deleted filter information to the rest of the network devices. The device that has combined the redundant filter information deletes the combined filter information, and the device in which the redundant filter information has been deleted resets the filter information.

For example, the network device 100 determines whether a resource state of the filter information (the number of registered filters) is equal to or larger than a threshold, at a predetermined time interval (or in a continuous manner). When the resource state is determined to be equal to or larger than the threshold, the network device 100 transmits the filter release request, which indicates that the combined filter information corresponding to the IP address 10.10.10.1 is deleted, to the filter setting unit. Subsequently, the network device 100 transmits the filter resetting request, which indicates that the combined filter information is reset, to the router 102, the router 103, and the router 104. The network device 100 deletes the filter information corresponding to the IP address 10.10.10.1 while the router 102, the router 103, and the router 104, which has received the filter resetting request, reset the combined filter information corresponding to the IP address 10.10.10.1 in the own device.

As described above, the resource state of the filter information in the device (the network device 100) for combining the redundant filter information is determined to be equal to or larger than the threshold, so that, when the resource state is determined to be equal to or larger than the threshold, the filter release request for deleting the combined filter information and the filter resetting request for resetting the filter information to be deleted, to the other network devices. Accordingly, the device (the network device 100) that has combined the redundant filter information can disable the combined filters depending on the resource state of the filter information, so that it is possible to prevent hardware resource depletion of the network device 100 that has combined the redundant filter information.

Figure 21:
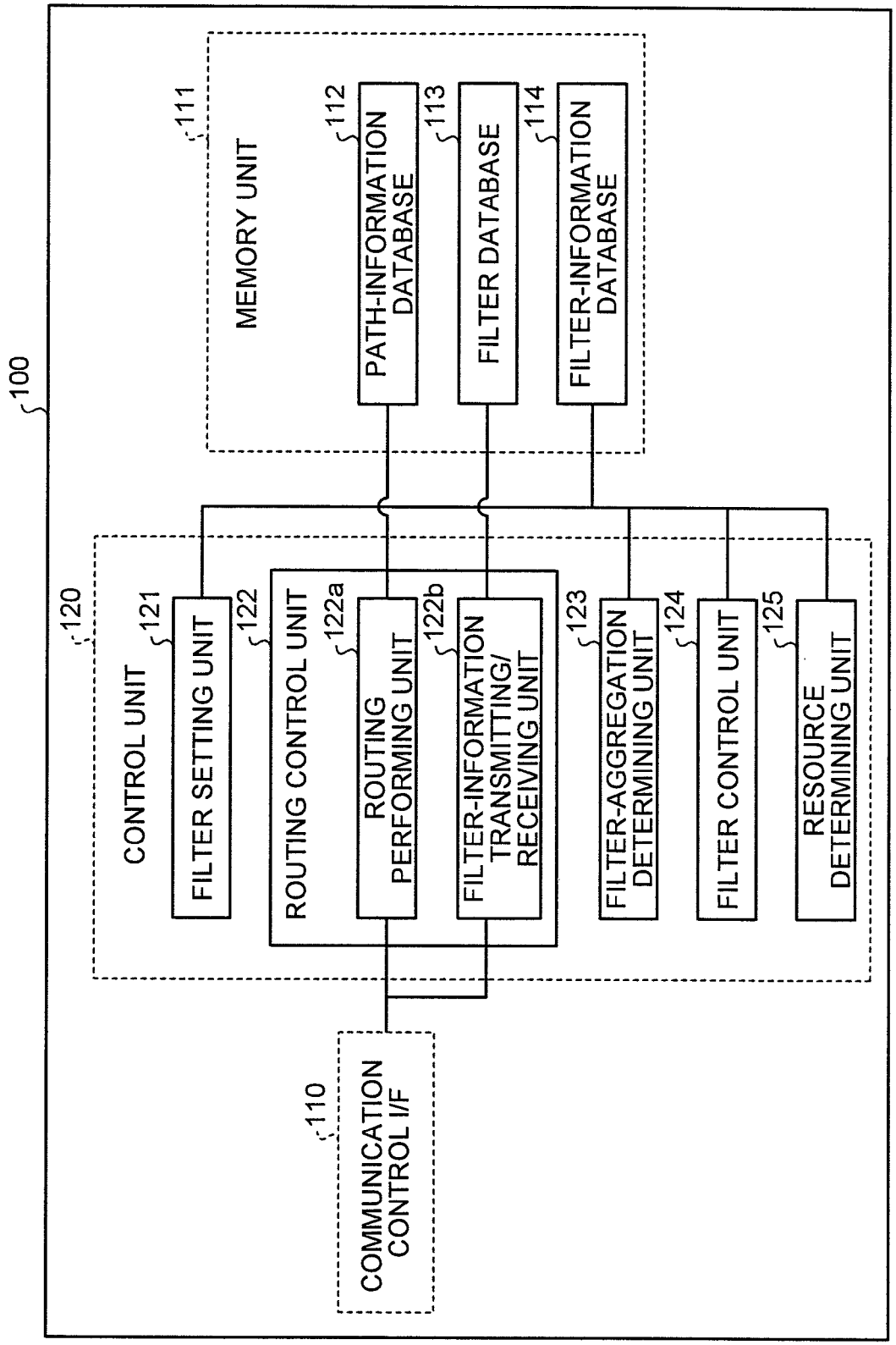
FIG. 21 is a block diagram of the network device shown in FIG. 20.

FIG. 21 is a block diagram of the network device 100. FIG. 22 is a table of an example of contents of a filter-information database 114 of the network device 100. As shown in FIG. 21, the network device 100 includes a communication control I/F 110, a memory unit 111, and a control unit 120. The memory unit 111 includes a path-information database 112, a filter database 113, and the filter-information database 114. The control unit 120 includes a filter setting unit 121, a routing control unit 122 including a routing performing unit 122*a* and a filter-information transmitting/receiving unit 122*b*, a filter-combining determining unit 123, a filter control unit 124, and a resource determining unit 125. The communication control I/F 110, the path-information database 112, the filter database 113, the filter setting unit 121, the routing control unit 122, and the filter-information transmitting/receiving unit 122*b* are respectively same as the communication control I/F 20, the path-information database 22, the filter database 23, the filter setting unit 31, the routing control unit 32, the filter-combining determining unit 33, so that the explanations thereof are omitted.

The filter-information database 114 in the memory unit 111 contains filter information to be set and the number of registrable filters. Specifically, the filter-information database 114 contains filter information to be set by the filter setting unit 121. For example, the filter-information database 114 contains the number of the registrable filters indicating the number of the registrable filters and the number of the registered filters indicating that the number of actually set filters, in addition to the information of "filter type, filter setting, hardware-setting flag, upper-level router, lower-level router" described in the first embodiment. For example, the filter-information database 114 contains "100, 90" as "number of registrable filters, number of registered filters" for the network device 100, and "100, 80" for the router 103.

The filter control unit 124 of the control unit 120 issues the filter release request for deleting the combined filter information to the filter setting unit 121 and issues the filter resetting request indicating that the filter information combined in the device in which the filter information is deleted, when the resource determining unit 125 determines that the resource state is equal to or larger than the threshold. For example, when the resource determining unit 125 determines that the number of the registrable filters is equal to or larger than the threshold (e.g., equal to or larger than 80), the network device 100 issues the filter release request for releasing the combined filters to the filter setting unit 121, and issues the filter resetting request for resetting the combined filter information to the router 102, the router 103, and the router 104.

The resource determining unit 125 determines whether the resource state of the filter-information database 114 is equal to or larger than the threshold. Specifically, the network device 100 determines whether the number of registered filters in the filter-information database 114 is equal to or larger than the threshold (e.g., equal to or larger than 80) at a pre-determined time interval, and notifies a determined result to the filter-combining determining unit 123.

Figure 26:
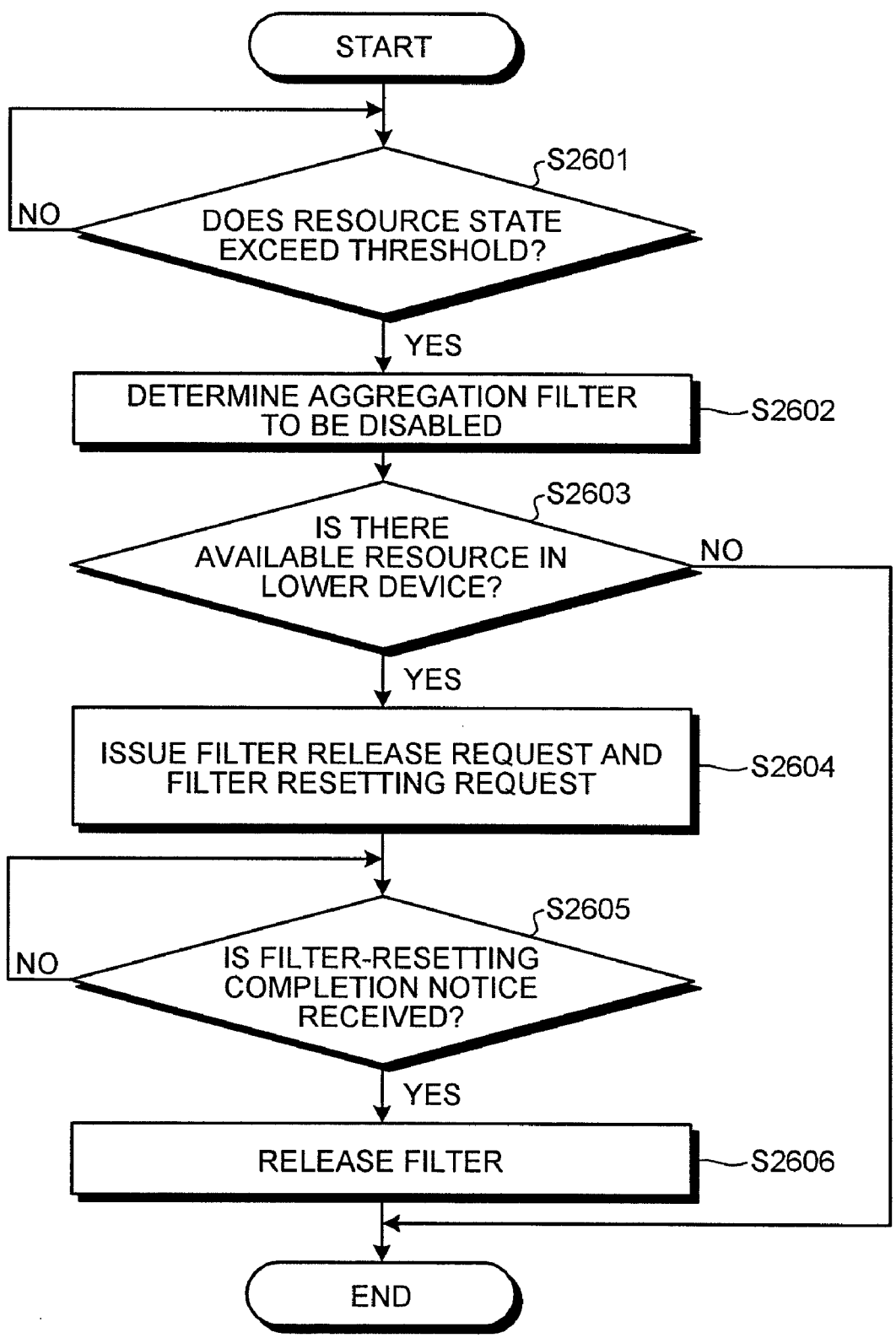
FIG. 26 is a flowchart of the filter-combining disabling process performed by the network device shown in FIG. 21.

The filter-combining releasing process performed by the network device 100 is described with reference to FIGS. 23 to 26. FIG. 23 is a table of an example of contents of a filter-information database stored in the network device 100. FIG. 24 is a table of an example of contents of a filter-information database stored in the router 102 before disabling the filter combining. FIG. 25 is a table of an example of contents of the filter-information database stored in the router 102 after disabling the filter combining. FIG. 26 is a flowchart of a filter-combining releasing process performed by the network device 100.

As shown in FIG. 26, when the resource determining unit 125 of the network device 100 determines that the resource state of the filter-information database 114 is equal to or larger than the threshold (Yes at step S2601), the network device 100 determines a combining filter to be disabled from the filter-information database 114 (step S2602).

For example, when the resource determining unit 125 of the network device 100 determines that the resource state of the filter information is equal to or larger than the threshold, the network device 100 determines a setting of "IP DA, 10.10.10.1, Yes, No, C, D, E" shown in FIG. 23 as the combining filter to be disabled, from the filter-information database 114. The combining filter to be disabled is determined based on whether the lower device is set in the filter-information database 114.

Subsequently, the network device 100 determines whether there is available resource in the lower device of the determined filter by sending a query to the lower device (step S2603). When it is determined that there is little available resource in the lower device (No at step S2603), the network device 100 terminates the process.

On the other hand, when it is determined that there is available resource in the lower device (Yes at step S2603), the filter control unit 124 of the network device 100 issues the filter release request for deleting the combined filter information to the filter setting unit 121, and issues the filter resetting request for resetting the combined filter information to the device that has deleted the filter information (step S2604).

For example, the network device 100 sends a query about whether there is available resource in the lower device (the router 102, the router 103, and the router 104) including the determined filter. When it is determined that there is the available resource in the lower device, the filter control unit 124 of the network device 100 issues the filter release request for deleting the combined filter information to the filter setting unit 121, and issues the filter resetting request for resetting the combined filter information to the router 102, the router 103, and the router 104.

When the network device 100 receives the filter-resetting completion notice from the lower device (Yes at step S2605), the network device 100 releases the reset filters (step S2606).

For example, the network device 100 releases the filter of "IP DA, 10.10.10.1, Yes, No, C, D, E" shown in FIG. 23. When receiving the filter resetting request from the network device 100, the router 102, the router 103, and the router 104 reset the filter from "IP DA, 10.10.10.1, No, A, No" to "IP DA, 10.10.10.1, Yes, No, No" as the setting of "filter type, filter value, hardware-setting flag, upper-level router, lower-level router" as shown in FIGS. 24 and 25. In other words, the hardware-setting flag is updated from "No" to "Yes", and the upper-level router is updated from "A" to "No".

As described above, according to the fourth embodiment, it is configured to include a resource determining unit that determines whether the resource state of the filter information is equal to or larger than the threshold, and when the resource state is determined to be equal to or larger than the threshold, the filter release request for deleting the combined filter information is issued to the filter setting unit, and the filter resetting request for resetting the filter information to be deleted to the rest of the network devices. Accordingly, the filters combined in the device (the network device 100) for combining the redundant filter can be disabled depending on the resource state of the filter information. As a result, it is possible to prevent the hardware resource depletion of the device for combining the filter information.

Although the embodiments of the present invention are described above, the present invention is not thus limited and various modifications can be available, which are described below as a fifth embodiment of the present invention.

According to the first to the fourth embodiments, it is assumed that the network device is a router in the layer 3. However, the present invention is not thus limited and can be applied to a communication in a layer 2. In this case, it is possible to use a spanning tree instead of the OSPF.

Furthermore, the process procedures, the control procedures, the specific names, and the information including various types of data and parameters that are presented in the text and the drawings (e.g., the configurations of various databases in the network devices shown in FIGS. 3 to 9, 17, and 22 to 25, and the topology tree shown in FIG. 11) can be modified in any forms, until otherwise noted.

Moreover, the constituent elements of the network devices shown in FIGS. 16 and 21 are based on functional concepts and do not necessarily have to be physically arranged in the way shown in the drawings. In other words, the specific mode in which the constituent elements are distributed and integrated (e.g., the control unit and the memory unit are integrated) is not limited to the ones shown in the drawings. A part or all of the apparatuses can be distributed or integrated, either functionally or physically in any arbitrary units according to various loads and use condition. A part or all of the processing functions offered by the constituent elements can be realized by a central processing unit (CPU) and a program analyzed and executed by the CPU, or can be realized as hardware with wired logic.

Furthermore, various processes described in the above embodiments can be realized by causing a computer system such as a personal computer terminal or a workstation to execute a predetermined program. An example of a computer system that executes the program having same functions as those explained in the above embodiments is described below.

Figure 27:
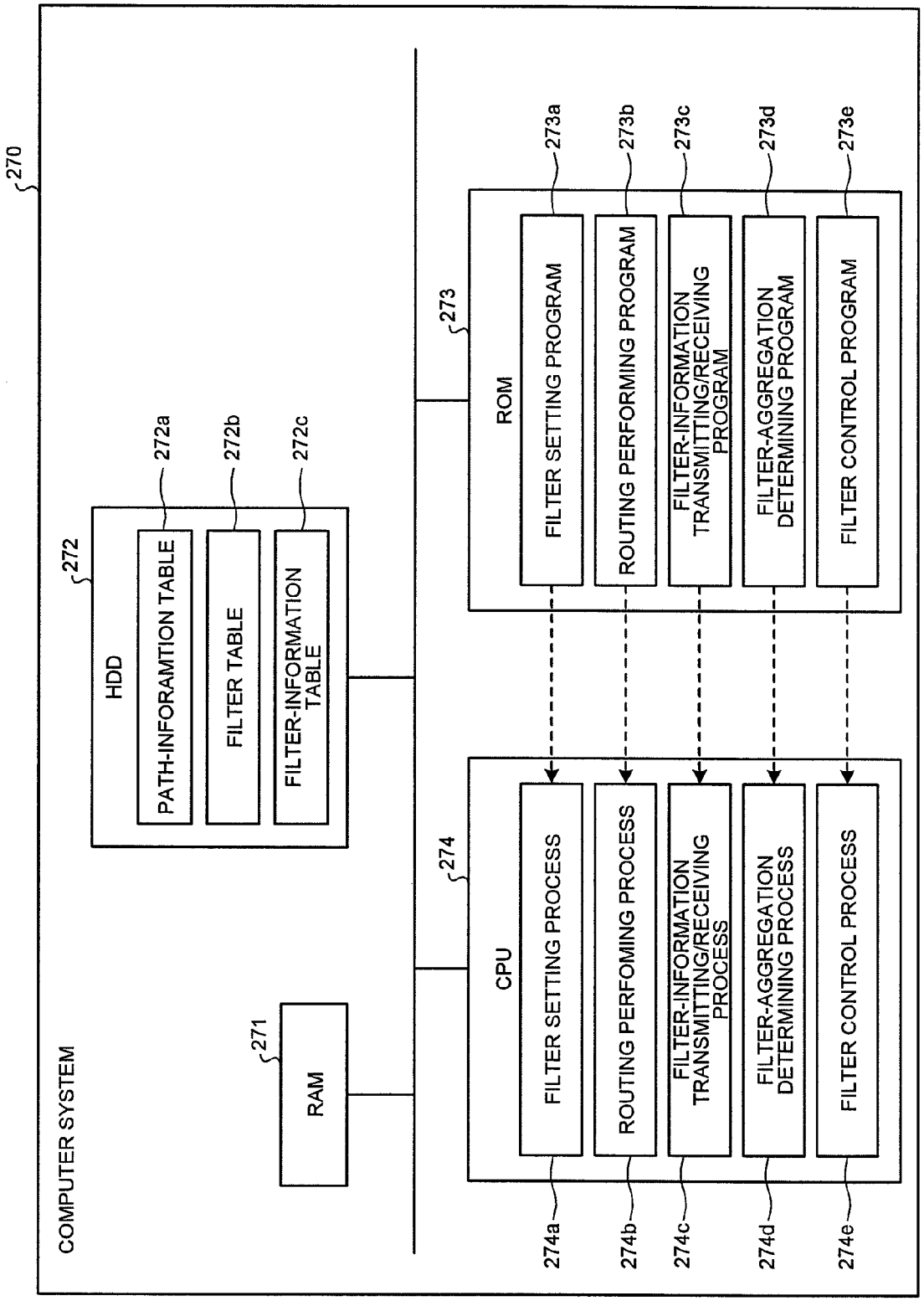
FIG. 27 is a block diagram of a computer system that executes a filtering program according to a fifth embodiment of the present invention.

FIG. 27 is a block diagram of a computer system 270 that executes a filtering program according to a fifth embodiment of the present invention. As shown in FIG. 27, the computer system 270 includes a random access memory (RAM) 271, a hard disk drive (HDD) 272, a read only memory (ROM) 273, and a CPU 274. The ROM 273 stores therein a program that performs the functions same as those described in the first to the fourth embodiments, i.e., a filter setting program 273a, a routing performing program 273b, a filter-information transmitting/receiving program 273c, a filter-combining determining program 273d, and a filter control program 273e.

The CPU 274 reads out and executes the programs 273a to 273e, so that the programs 273a to 273e are respectively executed as a filter setting process 274a, a routing performing process 274b, a filter-information transmitting/receiving process 274c, a filter-combining determining process 274d, and a filter control process 274e as shown in FIG. 27. The filter setting process 274a corresponds to the filter setting unit 31 shown in FIG. 2, the routing performing process 274b to the routing performing unit 32a, the filter-information transmitting/receiving process 274c to the filter-information transmitting/receiving unit 32b, the filter-combining determining process 274d to the filter-combining determining unit 33, and the filter control process 274e to the filter control unit 34.

The HDD 272 stores therein a path-information table 272a containing path information stored in each of the network devices, a filter table 272b containing filter information received from the rest of the network devices, and a filter-information table 272c containing filter information to be set. The path-information table 272a corresponds to the path-information database 22 shown in FIG. 2, the filter table 272b to the filter database 23, and the filter-information table 272c to the filter-information database 24.

The above programs 273a to 273e are not necessarily stored in the ROM 273. For example, the programs 273a to 273e can be stored in a removable physical medium to be inserted to the computer system, such as a flexible disk (FD), a compact disk read only memory (CD-ROM), a magneto optical (MO) disk, a digital versatile disk (DVD), and an integrated circuit (IC) card. Furthermore, the programs 273a to 273e can be stored in a built-in physical medium such as an HDD provided inside or outside of the computer system 270. Moreover, the programs 273a to 273e can be stored in other type of computer systems connected to the computer system 270 via a public line, the Internet, a local area network (LAN), or a wide area network (WAN). In this case, the computer system 270 can be configured to read out the programs from each of the above media for executing the programs.

As described above, according to one aspect of the present invention, for example, the network device is configured to determine a router that is closest to the IP address specified as a filtering condition of the filter-setting information in the network, i.e., the device for combining redundant filter information, and to determine a router that is farthest to the specified IP address, i.e., the device for deleting the redundant filter information, by using the shortest-path search or the like. Accordingly, the device can combine the filter-setting information that is redundantly set in the lower-level routers, and the device can delete the redundant filter-setting information, so that it is possible to delete copies of an access control list redundantly set in a plurality of the routers in the network. Therefore, it is possible to effectively assure hardware resources of the routers in the same network.

Furthermore, according to another aspect of the present invention, it is possible to prevent a large amount of packets from flowing into the network, which is caused by combining the filters with high validity (high access hit ratio). As a result, an increase of a network load can be prevented.

Moreover, according to still another aspect of the present invention, even when the device for combining the filter information does not include the filter-combining function, the device of which filter information is to be deleted transmits the filter-setting request to the upper device, so that the filter can be set. Therefore, it is possible to easily incorporate the network device to the existing network.

Furthermore, according to still another aspect of the present invention, the filters combined in the device for combining the redundant filter can be disabled depending on the resource state of the filter information, so that it is possible to prevent the hardware resource depletion of the device for combining the filter information.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network device that performs a packet filtering based on set filter information and performs a transmission and a reception of path information with other network device that is connected to the network device via a network, the network device comprising:

a filter setting unit that sets the filter information based on a predetermined request received from either one of the network device and the other network device;

a filter-information transmitting/receiving unit that transmits the path information with the filter information added when the filter information is set by the filter setting unit, and receives the path information with the filter information added when the filter information is set in the other network device;

a filter-combining determining unit that determines whether redundant filter information that is redundantly set between the network device and the other network device is to be combined or deleted, based on the filter information and the path information received by the filter-information transmitting/receiving unit; and a filter control unit that issues a filter-setting request for combining the redundant filter information to the filter setting unit when it is determined that the redundant filter information is to be combined, and issues a filter release request for deleting the redundant filter information to the filter setting unit when it is determined that the redundant filter information is to be deleted.

2. The network device according to claim 1, further comprising a validity calculating unit that calculates a validity of the filter information, wherein
the filter-combining determining unit determines whether the redundant filter information is to be combined or deleted, further based on the validity calculated by the validity calculating unit.

3. The network device according to claim 1, wherein
the filter-combining determining unit determines whether the other network device with which the redundant filter information is to be combined includes the filter-combining determining unit, and
when it is determined that the other network device with which the redundant filter information is to be combined does not include the filter-combining determining unit, the filter control unit transmits a filter combining request for combining the redundant filter information to the other network device with which the redundant filter information is to be combined.

4. The network device according to claim 1, further comprising a resource determining unit that determines whether a resource state of the filter information is equal to or larger than a threshold, wherein
when it is determined that the resource state is equal to or larger than the threshold, the filter control unit issues a filter release request for deleting combined filter information to the filter setting unit and issues a filter resetting request for resetting the filter information to be deleted to the other network device.

5. A non-transitory computer-readable recording medium that stores therein a computer program for performing a packet filtering based on set filter information and performing a transmission and a reception of path information between a network device and other network device that is connected to the network device via a network, the computer program causing a computer to execute:
setting the filter information based on a predetermined request received from either one of the network device and the other network device;
filter-information transmitting/receiving including
transmitting the path information with the filter information added when the filter information is set at the setting, and
receiving the path information with the filter information added when the filter information is set in the other network device;
determining whether redundant filter information that is redundantly set between the network device and the other network device is to be combined or deleted, based on the filter information and the path information received at the filter-information transmitting/receiving; and
filter controlling including
issuing a filter-setting request for combining the redundant filter information to the setting when it is determined that the redundant filter information is to be combined, and
issuing a filter release request for deleting the redundant filter information to the setting when it is determined that the redundant filter information is to be deleted.

6. The non-transitory computer-readable recording medium according to claim 5, further comprising calculating a validity of the filter information, wherein
the determining includes determining whether the redundant filter information is to be combined or deleted, further based on the validity calculated at the calculating.

7. The non-transitory computer-readable recording medium according to claim 5, wherein
the determining includes determining whether the other network device with which the redundant filter information is to be combined includes a function of the determining, and
when it is determined that the other network device with which the redundant filter information is to be combined does not include the function of the determining, the filter controlling includes transmitting a filter combining request for combining the redundant filter information to the other network device with which the redundant filter information is to be combined.

8. The non-transitory computer-readable recording medium according to claim 5, further comprising determining whether a resource state of the filter information is equal to or larger than a threshold, wherein
when it is determined that the resource state is equal to or larger than the threshold, the filter controlling includes issuing a filter release request for deleting combined filter information to the setting, and
issuing a filter resetting request for resetting the filter information to be deleted to the other network device.

* * * * *